(12) United States Patent
Baeten et al.

(10) Patent No.: US 8,151,674 B2
(45) Date of Patent: Apr. 10, 2012

(54) LAYER CUTTING APPARATUS

(75) Inventors: James R. Baeten, Bloomington, MN (US); Vanessa L. Little, Prior Lake, MN (US); Karalyn A. Littlefield, Wyoming, MN (US); Mark W. Yungner, Maple Grove, MN (US); Robert A. Zoss, Plymouth, MN (US); Linda Baggio, Hopkins, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 0 days.

(21) Appl. No.: 12/870,887

(22) Filed: Aug. 30, 2010

(65) Prior Publication Data

US 2010/0319504 A1 Dec. 23, 2010

Related U.S. Application Data

(63) Continuation of application No. 11/334,809, filed on Jan. 18, 2006, now abandoned.

(60) Provisional application No. 60/655,211, filed on Feb. 22, 2005.

(51) Int. Cl.
*B26D 1/547* (2006.01)

(52) U.S. Cl. ........ 83/13; 83/200.1; 83/307.1; 83/651.1; 83/932; 30/116; 426/122; 426/128

(58) Field of Classification Search .............. 83/200.1, 83/932, 651.1, 307.1–307.3, 13; 220/8, 23.9; 426/106, 119, 120, 122, 126–128; 30/115–117
See application file for complete search history.

(56) References Cited

U.S. PATENT DOCUMENTS

| | | |
|---|---|---|
| 817,027 A | 4/1906 | Widdicombe |
| 1,595,097 A | 8/1926 | Howell |
| 1,864,921 A | 6/1932 | Mayer |
| 2,132,144 A | 10/1938 | Blum |
| 2,158,667 A | 5/1939 | Rieck et al. |
| 2,255,942 A | 9/1941 | Salmon |
| 2,589,911 A | 3/1952 | Weinberg |
| 2,717,444 A | 9/1955 | Tomik |
| 2,964,844 A | 12/1960 | Steward et al. |
| 3,277,754 A | 10/1966 | Lopez |
| 3,821,916 A | 7/1974 | Ricci et al. |
| 4,213,241 A | 7/1980 | Haapala |
| 4,672,873 A | 6/1987 | Kinser |
| D363,870 S | 11/1995 | Oberloier et al. |
| 6,647,848 B1 | 11/2003 | Bruner |

FOREIGN PATENT DOCUMENTS

WO WO 87/06517 A1 11/1987

*Primary Examiner* — Phong Nguyen
(74) *Attorney, Agent, or Firm* — John L. Crimmins; Alan Kamrath

(57) ABSTRACT

A layer cutting apparatus includes a tray having an interior defined by a bottom and sidewall. A sleeve is at least partially disposed in the interior of the tray, and a cutting line is attached to the sleeve. The cutting line is configured to be removed from the sleeve by pulling the line away from the tray at one point of the sidewall.

6 Claims, 24 Drawing Sheets

LAYER CUTTING APPARATUS

CROSS REFERENCE TO RELATED APPLICATIONS

This application is a continuation of U.S. patent application Ser. No. 11/334,809 filed on Jan. 18, 2006 now abandoned which claims benefit of U.S. Provisional Patent Application Ser. No. 60/655,211, filed Feb. 22, 2005, entitled "LAYER CUTTING APPARATUS", which are incorporated herein by reference.

FIELD OF THE INVENTION

The invention relates generally to layer cutting assemblies. More particularly, the invention relates to a layer cutting tray and sleeve apparatus for allowing a user to slice layers of baked goods accurately and evenly.

BACKGROUND

During the commercial preparation of food products, especially products for the bakery or foodservice industries, it is often desirable to cut a cake or other product into some predetermined form or shape. For example, in the case of frozen cakes, it is common for a commercial kitchen or bakery to employ hand laborers to slice the cakes into layers for further decorating or sale.

In many kitchens, a large knife is used to separate frozen cakes into layers. This technique is labor intensive and often requires extreme care to avoid injuries to kitchen personnel. Forming layers with a knife also requires a certain level of skill to ensure the layers are visually appealing.

In view of the considerations outlined above, a variety of cutting assemblies have been developed to separate cakes into layers. Known prior art includes U.S. Pat. No. 2,589,911; U.S. Pat. No. 3,277,754; U.S. Pat. No. 4,213,241; U.S. Pat. No. 2,964,844; U.S. Pat. No. 817,027; and U.S. Pat. No. Des. 363,870. While these devices fulfill their particular objectives and requirements, the aforementioned devices are large and cumbersome. Accordingly, they tend to consume significant space in commercial facilities. Therefore, known layer-cutters are not always adaptable to existing layouts.

SUMMARY

A primary object of the invention is to provide a layer cutter that is safe, effective and efficient in the setting of a home kitchen, or commercial foodservice operation, such as an institutional kitchen or bakery.

Another object of the invention is to provide a layer cutting device that is capable of smooth and quiet operation that does not require a source of electric power.

It is another object of the invention to provide a layer cutting apparatus that is capable of cutting layers into food products that are firm enough to maintain a distinct shape.

It is yet another object of the invention to provide a layer cutting apparatus that is incorporated into the packaging of high volume cakes and capable of one-time use.

These and other objects of the invention are achieved by providing a layer cutting apparatus including a tray having an interior defined by a bottom and sidewall. A sleeve is at least partially disposed in the interior of the tray, and a cutting line is attached to the sleeve. The cutting line is configured to be removed from the sleeve by pulling the line outward from one point of the sidewall.

In another aspect of the invention, the invention includes a method of dividing a food product into layers. The method comprises providing a tray containing a food product. The tray has a bottom, a first side, a second side, a front wall, and a back wall. The method also includes the steps of suspending a line between the first side and the second side, adjacent to the front wall and moving the line along the first side and the second side from a position adjacent to the front wall to a position adjacent to the back wall.

In yet another embodiment, the invention includes a food package kit comprising a tray having a bottom. A food product is disposed on the bottom of the tray. A sleeve is at least partially disposed about the perimeter of the food product. A cutting line is attached to the sleeve. At least a portion of the cutting line is located between the sleeve and the food product.

These and other aspects of the invention will be more apparent from the following description of the preferred embodiment thereof when considered in connection with the accompanying drawings and appended claims.

DESCRIPTION OF THE DRAWINGS

The invention may be more completely understood in consideration of the following detailed description of various embodiments of the invention in connection with the accompanying drawings, in which.

Figure 1:
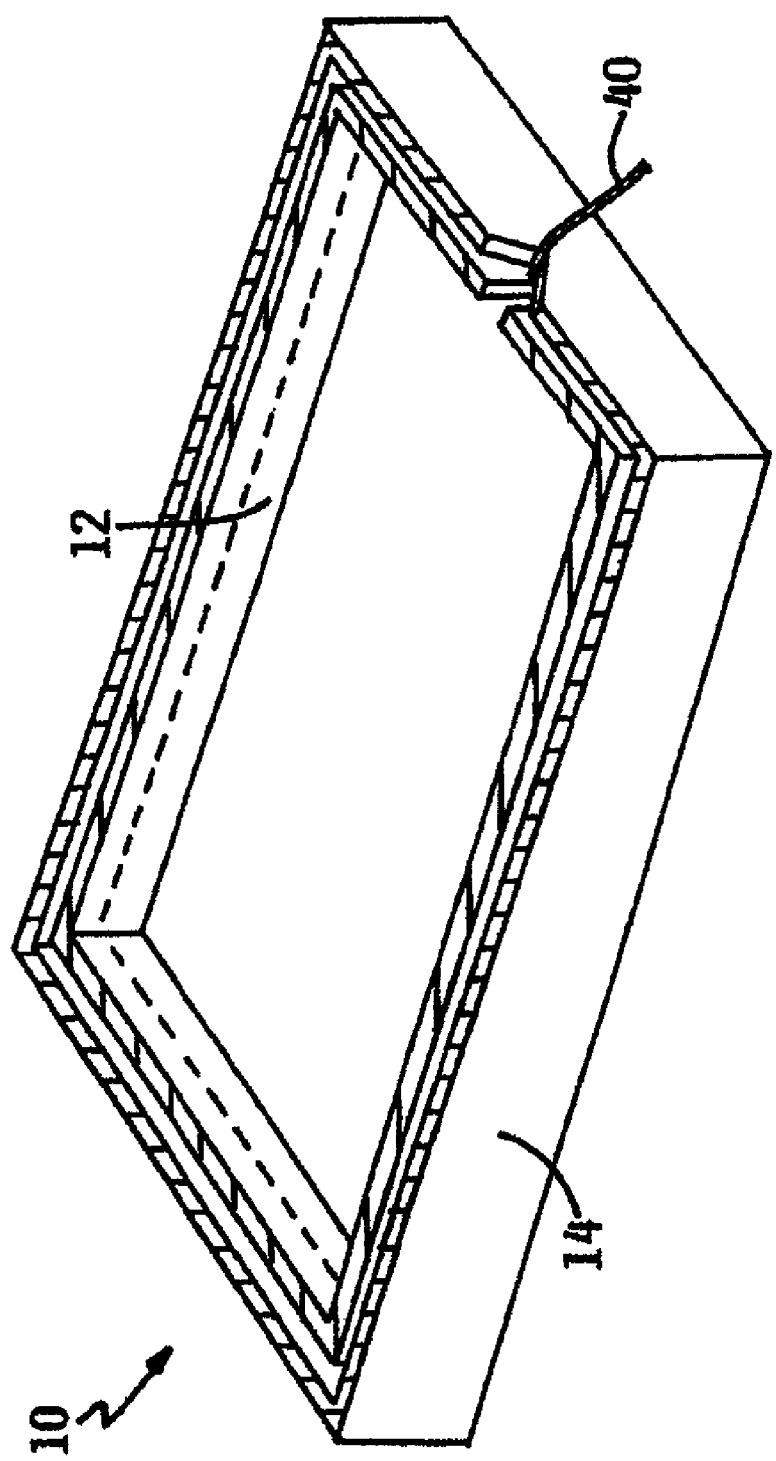
FIG. 1 shows an isometric view of a layer cutting apparatus pursuant to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 2:
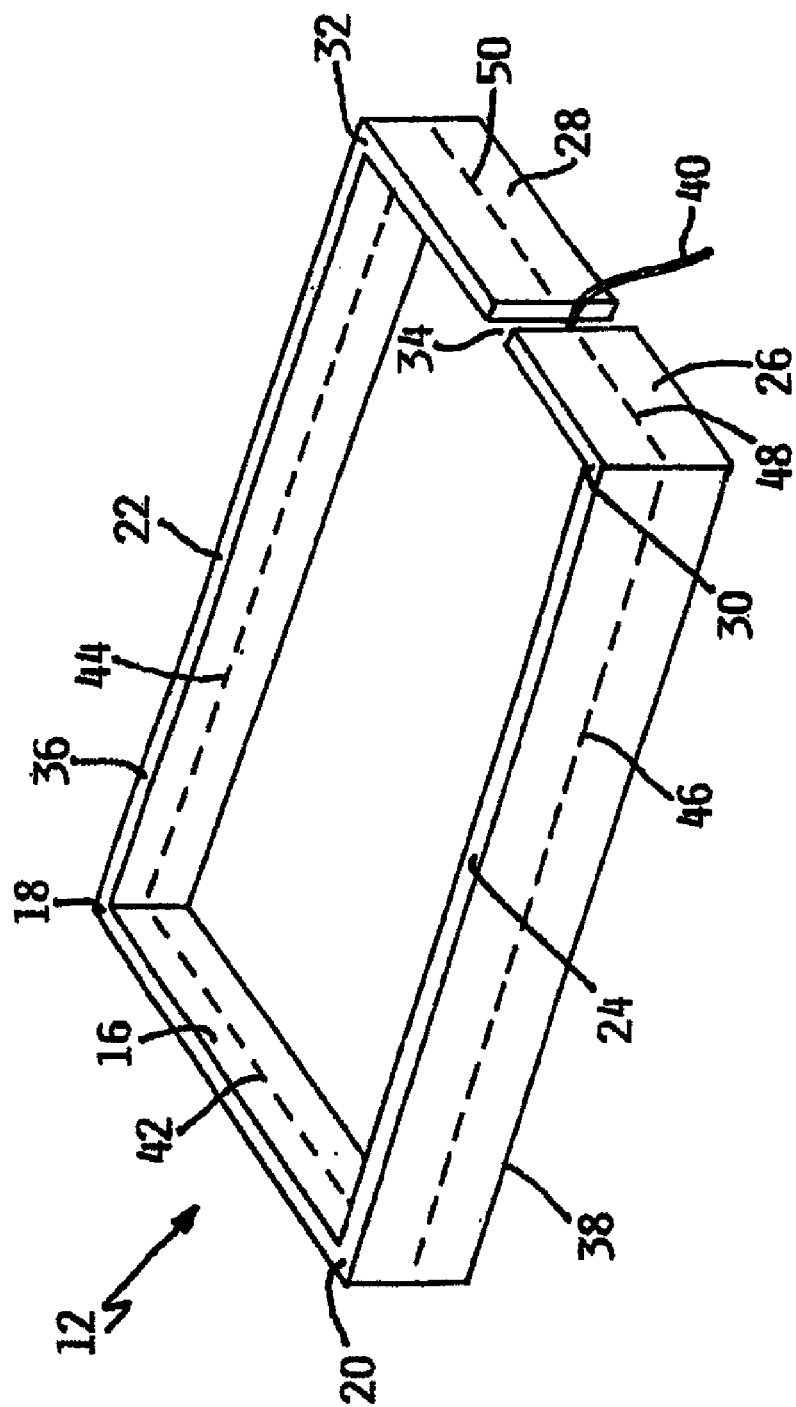
FIG. 2 shows an isometric view of a cutting sleeve pursuant to the invention.
Figure 3:
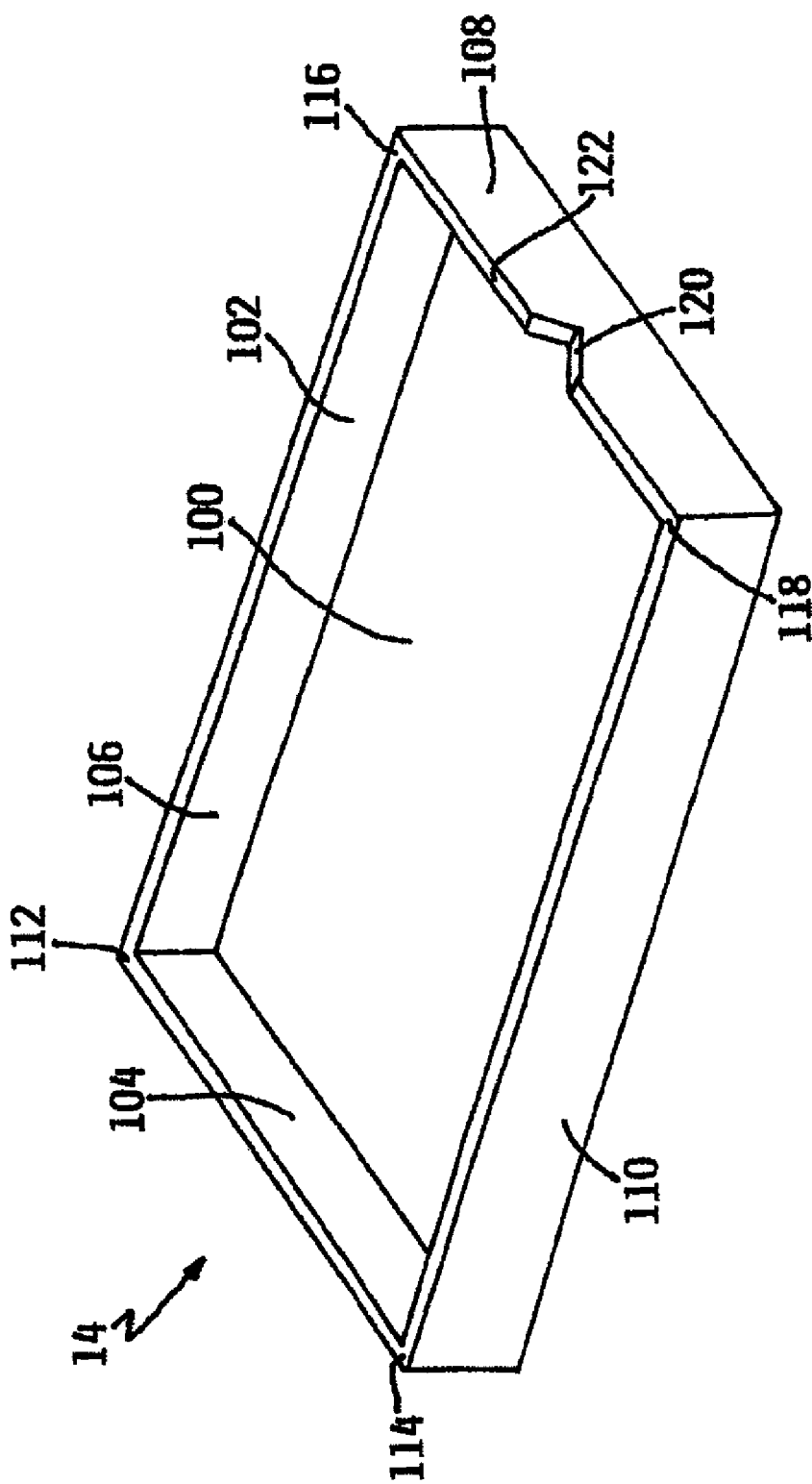
FIG. 3 shows an isometric view of a cutting tray pursuant to the invention.

With reference to FIGS. 1 through 3, the cake-layer cutting apparatus 10 embodying the principles and concepts of the present invention will be described. Apparatus 10 includes sleeve 12 and tray 14. Sleeve 12 is configured to fit inside the inner periphery of tray 14 as shown.

Sleeve 12 includes an elongated first side 16 terminating at a first corner 18 and a second corner 20. A second side 22 extends from first side 16 at first corner 18. Second side 22 terminates at third corner 32. Similarly, a third side 24 extends from first side 16 at second corner 20. Third side 24 terminates at fourth corner 30. Panel 26 extends from third side 24 at fourth corner 30. Panel 28 extends from second side 22 at third corner 32. Aperture 34 defines the area between panel 26 and panel 28.

Sleeve 12 includes a top edge 36 and a bottom edge 38. In FIG. 2, top edge 36 is shown parallel to bottom edge 38 although this configuration is not necessary to the invention. Cutting line 40 is shown extending through aperture 34. Cutting line 40 is attached to sleeve 12 in a plurality of locations throughout first side 16, second side 22, third side 24, panel 26, and panel 28. In one embodiment, cutting line 40 is woven through sleeve 12 in a linear fashion. In an alternative embodiment, cutting line 40 may be attached to sleeve 12 using adhesive. In yet another embodiment, cutting line 40 may be disposed within sleeve 12.

Figure 19:
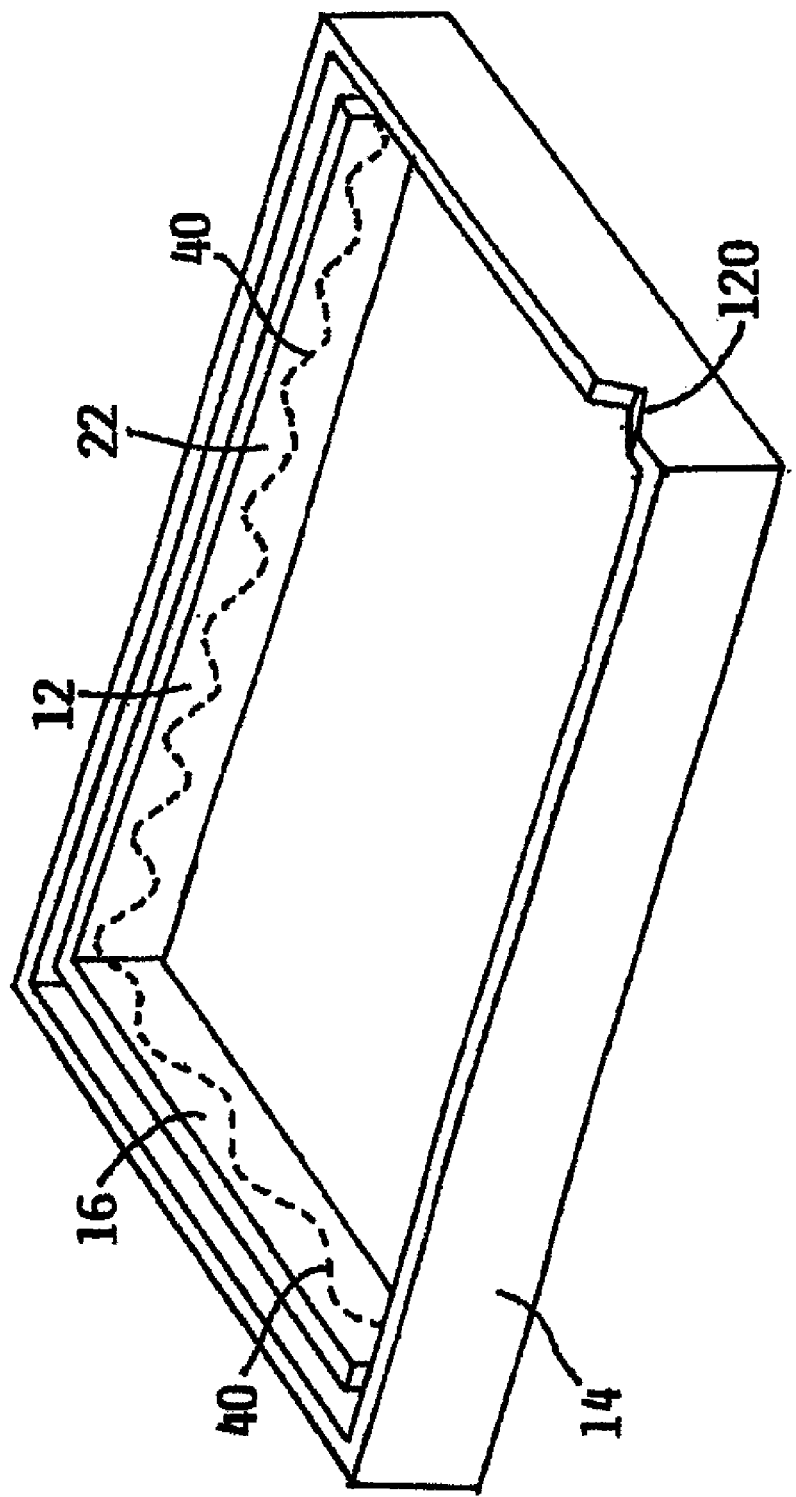
FIG. 19 shows an isometric view of yet another alternative embodiment of the layer cutting apparatus.

The portion of cutting line 40 woven through first side 16 forms a first segment 42. The portion of cutting line 40 woven through second side 22 forms a second segment 44. The portion of cutting line 40 woven through third side 24 forms a third segment 46. The portion of cutting line 40 woven through panel 26 forms a beginning segment 48. The portion of cutting line 40 woven through panel 28 forms an end segment 50. Segments 42, 44, 46, 48, and 50 are generally parallel to bottom edge 38. In an alternative embodiment, segments 42, 44, 46, 48, and 50 could comprise a wavy or zig-zag configuration as shown in FIG. 19. For example, when cutting line 40 is pulled away from first side 16 of sleeve 12, a wavy pattern is created. As cutting line 40 is pulled away from second side 22 of sleeve 12, a jagged zig-zag, pattern is created.

In one embodiment, sleeve 12 is fabricated of corrugated or paperboard. In another embodiment, sleeve 12 is fabricated of another paper-based product in the range of about 20-52 lb. per ream weight. Sleeve 12 may be fabricated of a variety of other food approved materials of sufficient rigidity to withstand the force of cutting line 40 as it is removed from sleeve 12. In a preferred embodiment, materials for sleeve 12 are capable of maintaining their structural integrity during baking temperatures exceeding 350° F. (177° C.). Alternative materials for sleeve 12 include various metals, glass, or thermoformed plastic material, such as polyolefins (e.g., polypropylene, polyethylene), blends of polyolefins, polystyrene—HIPS, or polyester resin-based materials—CPET, foamed polypropylene, polyethylene), blends of polyolefin's polystyrene—HIPS, or polyester resin-based materials—CPET, paper and paper laminations with polypropylene, polyester, etc.

With reference to FIG. 3, tray 14 will now be discussed. Tray 14 includes a bottom 100 and sidewall 102. Sidewall 102 extends upward from the perimeter of the bottom 100. Bottom 100 is shown in a rectangular configuration, although bottom 100 can be comprised of any 2-D shape, regular or irregular, including circles, triangles, footballs, hearts, or any other polygon while remaining within the scope of the invention.

Figure 20:
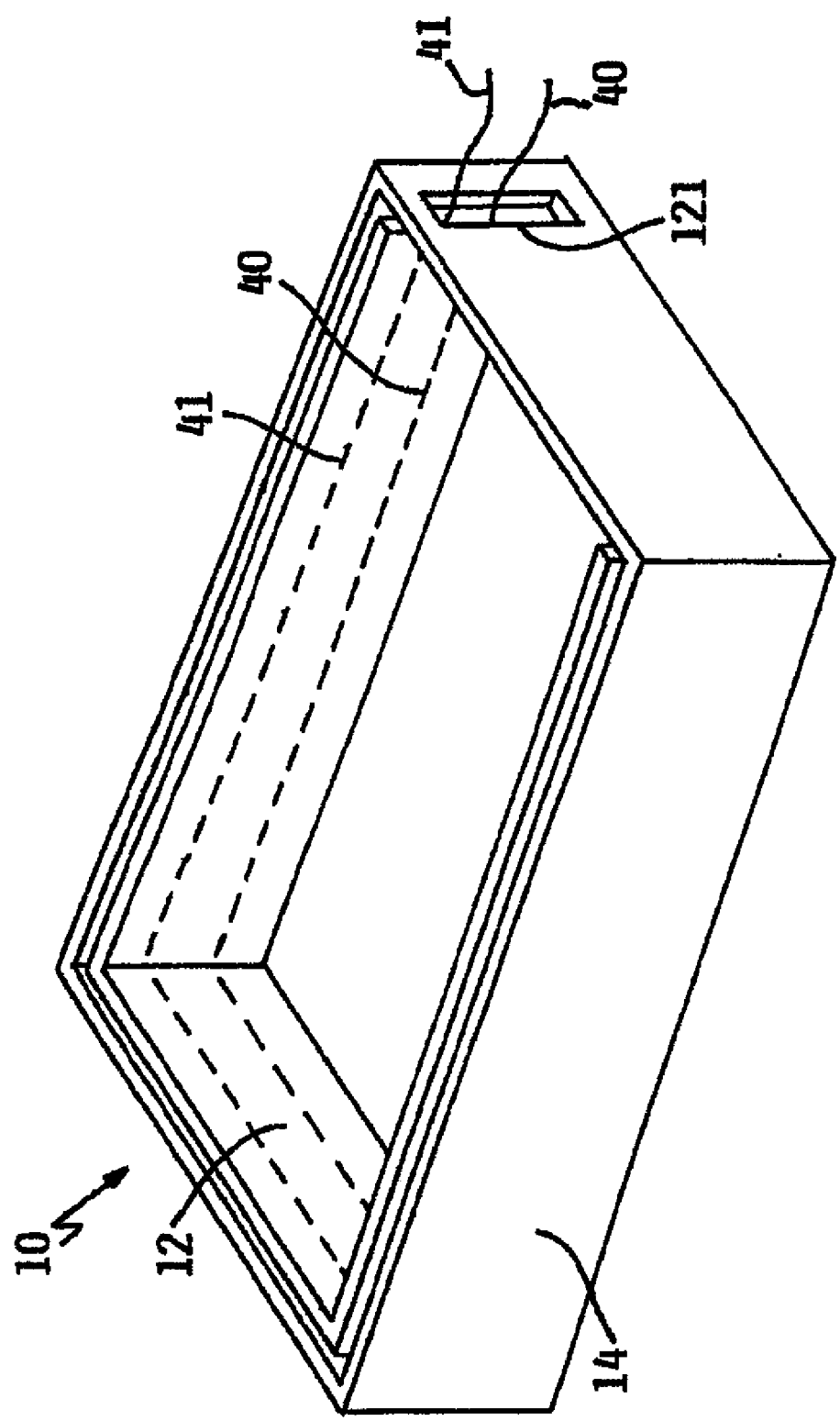
FIG. 20 shows an isometric view of a multiple layer cutting apparatus.
Figure 24:
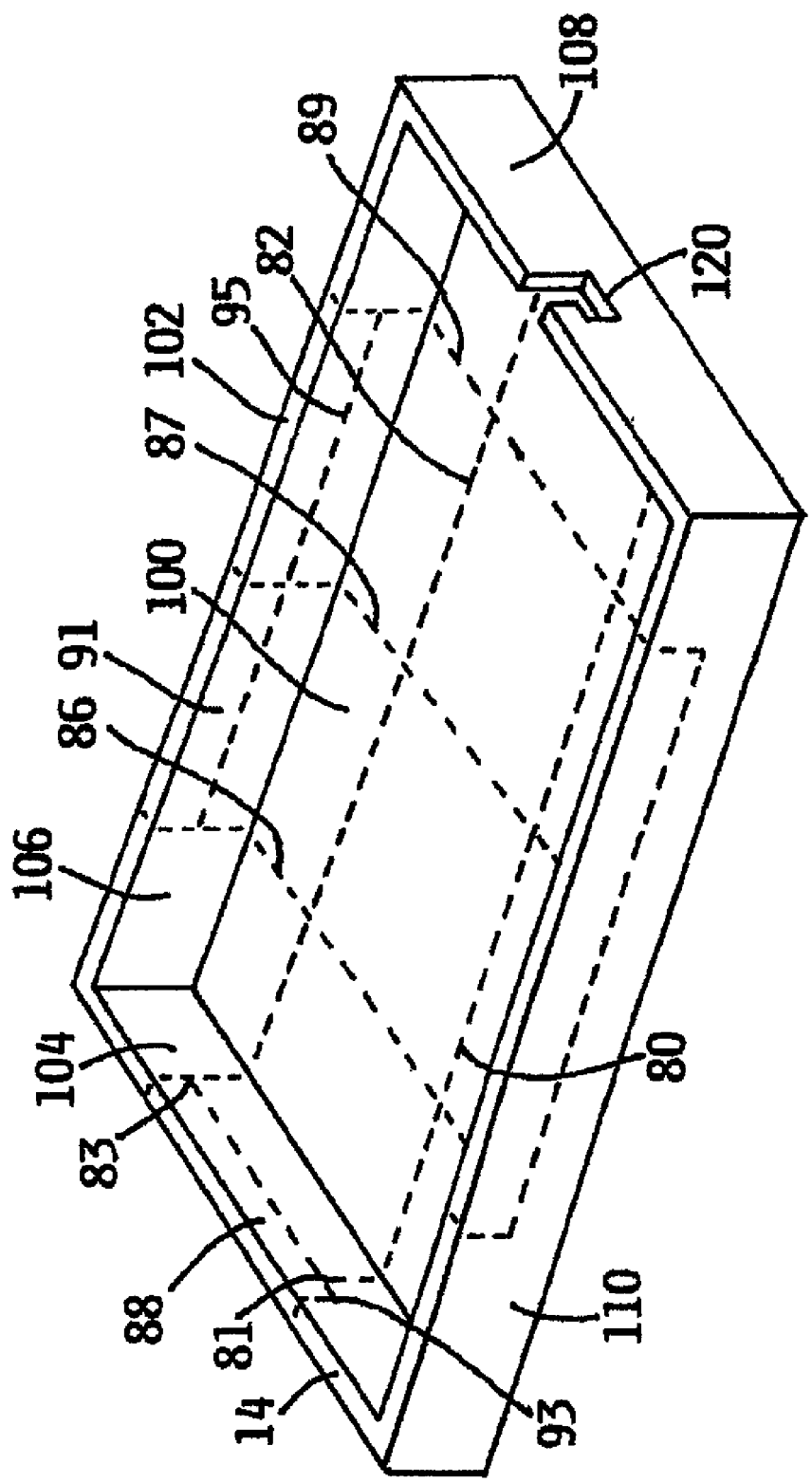
FIG. 24 shows an isometric view of an alternative embodiment of the cutting apparatus incorporating a portion forming mechanism.

Sidewall 102 includes an elongated first wall 104 terminating at first corner 112 and second corner 114. Second wall 106 extends from first wall 104 at first corner 112. Second wall 106 terminates at third corner 116. Third wall 110 extends from first wall at second corner 114. Third wall 110 terminates at fourth corner 118. Fourth wall 108 is disposed between third corner 116 and fourth corner 118. Notch 120 is disposed in fourth wall 108 such that notch 120 extends below top surface 122 of fourth wall 108. Notch 120 provides clearance for cutting line 40 when sleeve 12 rests on bottom 100 of tray 14 as shown in FIG. 1. Notch 120 may comprise a variety of configurations, including a hole or an "L" shaped cutout as shown in FIGS. 20 and 24, while remaining within the scope of the invention. Alternatively, notch 120 may be located at any one of corners 112, 114, 116, or 118 while remaining within the scope of the invention. Additionally, notch 120 may be at any location along any of the walls.

Top surface 122 extends around notch 120 at fourth wall 108, second wall 106, first wall 104, and third wall 110. In one embodiment, top surface 122 defines a plane substantially parallel to the plane that includes bottom 100, although such configuration is not necessary to the invention.

Tray 14 is preferably fabricated of paperboard or a similar paper product. However, tray 14 may be fabricated of a variety of other food approved materials of sufficient rigidity to at least partially support the weight of a food product. In a preferred embodiment, materials for tray 14 are capable of maintaining their structural integrity during baking temperatures exceeding 350° F. (177° C.). Alternative materials for tray 14 include various metals, glass, or thermoformed plastic material of the type previously described.

Tray 14 may be a variety of sizes sufficient to contain a food product 200 while remaining within the scope of the invention. In one embodiment, the distance between first wall 104 and fourth wall 108 is between about 3 inches and about 30 inches. In another embodiment, the distance between first wall 104 and fourth wall 108 is about 16.75 inches. The distance between second wall 106 and third wall 110 is between about 3 inches and about 35 inches. In another embodiment, the distance between second wall 106 and third wall 110 is about 24.75 inches. Similarly, the height of sidewall 102 from bottom 100 to top surface 122 may also comprise a variety of sizes while remaining within the scope of the invention. In one embodiment, the height of sidewall 102 is between about 1 inch and about 8 inches.

In operation, a food product can be baked in the interior of tray 14. Alternatively, a pre-made food product can be placed on the bottom 100 of tray 14. The food product can be a cake, intermediary food product, or any other baked good. Next, sleeve 12 is placed in tray 14 so that at least a portion of the sleeve 12 is between the food product and the second sidewall 106. In a preferred embodiment, sleeve 12 rests on the bottom 100 of tray 14 and extends around the perimeter of the food product, between the food product and the sidewall 102.

Figure 4:
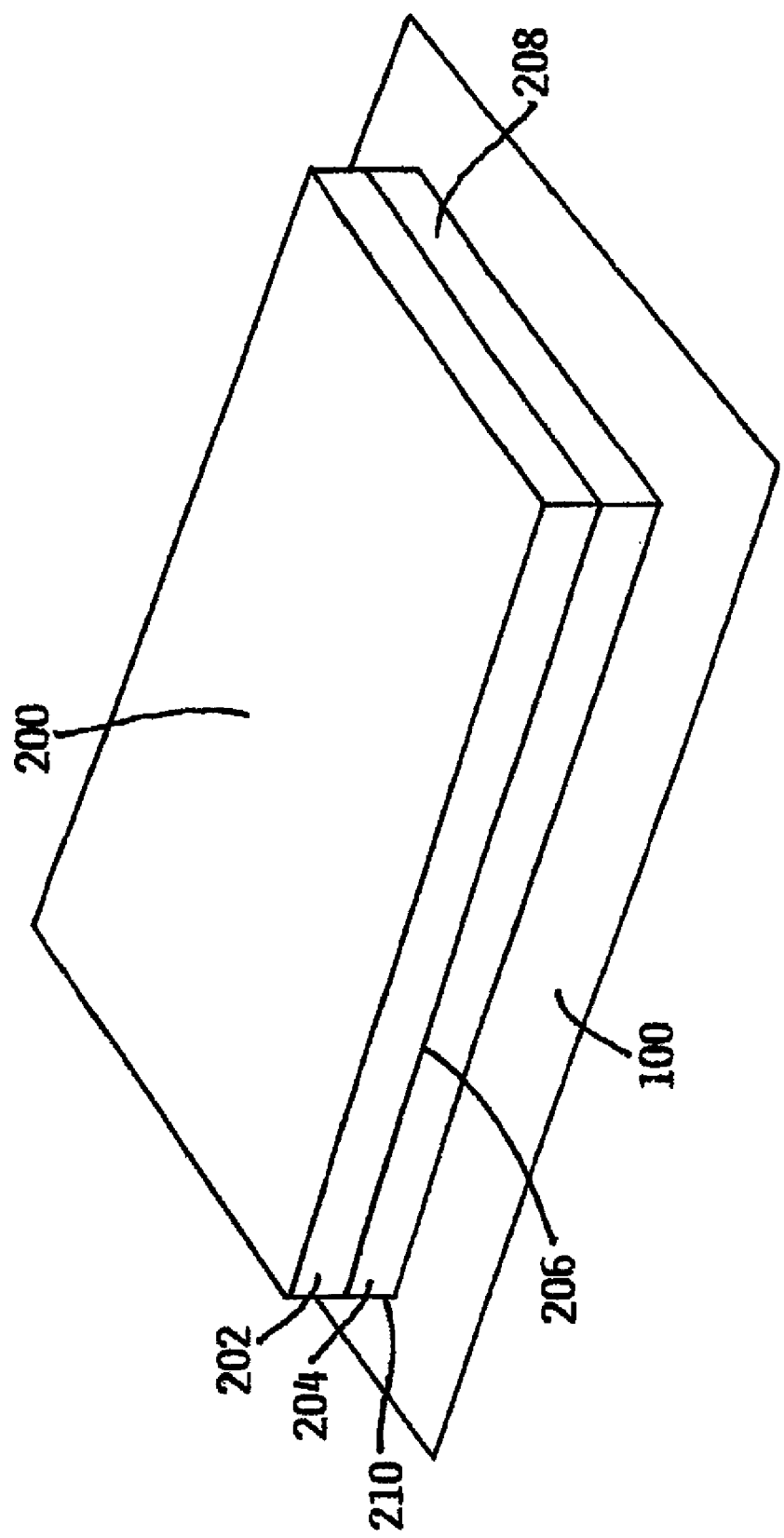
FIG. 4 shows an isometric view of a cake that has been separated into layers using the invention.

FIG. 4 shows a food product 200 that has been sliced using apparatus 10. Food product 200 is divided into an upper layer 202 and a lower layer 204 at partition 206. The plane that defines partition 206 is substantially parallel to the plane that defines bottom 100. This aspect of the invention enables lower layer 204 to maintain a uniform thickness from first end 208 to second end 210. A layer of non-stick parchment paper may be located between lower layer 204 and bottom 100. Alternatively, bottom 100 may be treated with a releasing compound or non-stick substance.

In one embodiment, cutting line 40 includes a cotton string. In alternative embodiments, cutting line 40 includes a metal wire, nylon monofilament, polymer-based string, elastomer filament or similar filament capable of withstanding baking temperatures. Cutting line 40 can be fabricated of a variety of other materials having sufficient tensile strength to withstand the force required to separate cutting line 40 from sleeve 12 and move cutting line 40 through a food product 200 during the cutting process. Suitable materials have a tensile strength of at least 1 pound per square inch. Common diameters of cutting line 40 are in the range of about 1 mm to about 0.25 inches.

Figure 5:
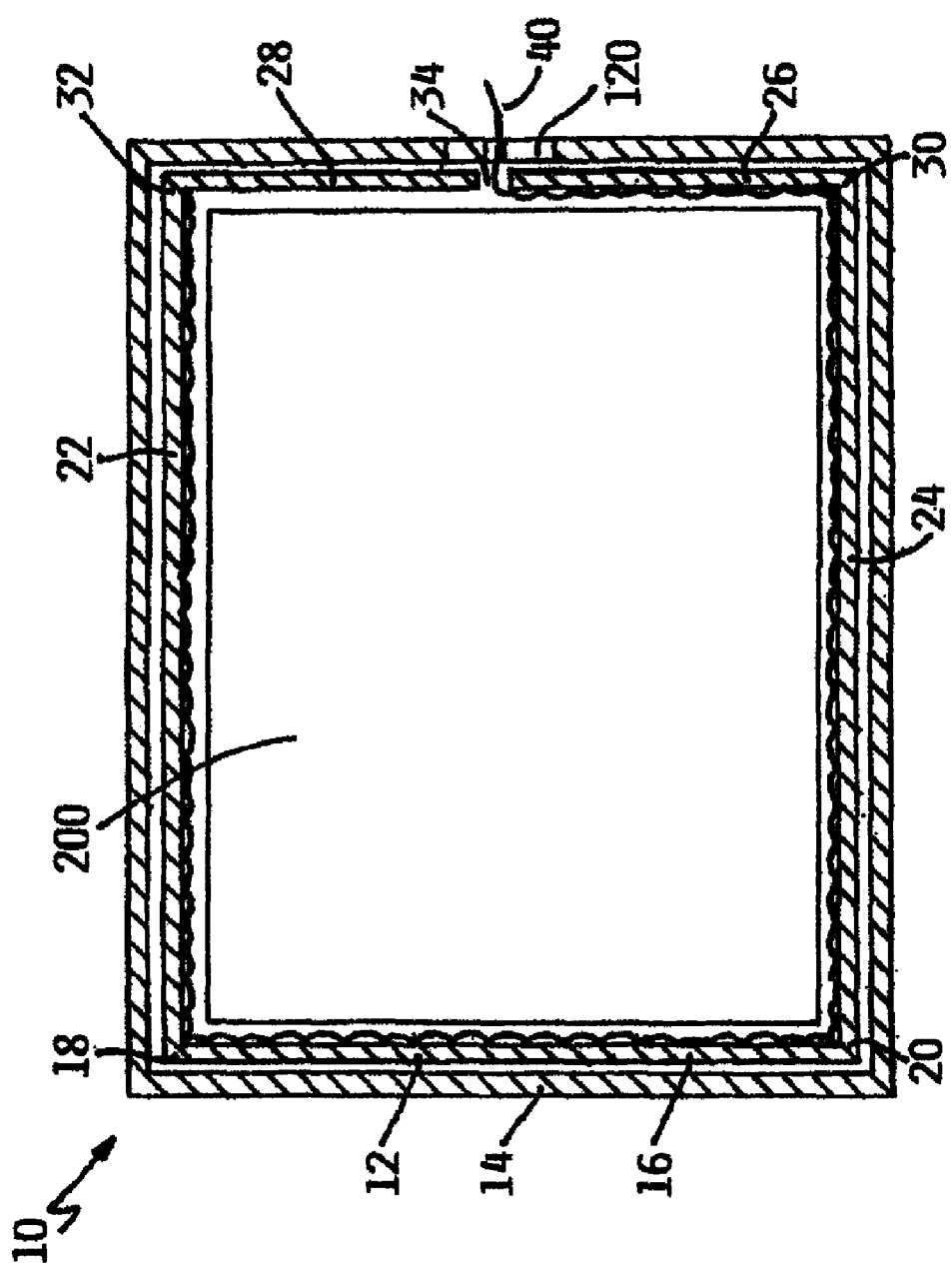
FIG. 5 shows a top plan view of a layer cutting apparatus pursuant to the invention.

With reference to FIGS. 5-11, the cutting operation of apparatus 10 will now be discussed. FIG. 5 illustrates the location of the food product 200 inside tray 14. Sleeve 12 is disposed about the perimeter of food product 200 such that aperture 34 is adjacent to notch 120. Cutting line 40 extends through aperture 34 and notch 120 and is attached to sleeve 12 throughout panel 26, third side 24, first side 16, second side 22, and panel 28.

Figure 6:
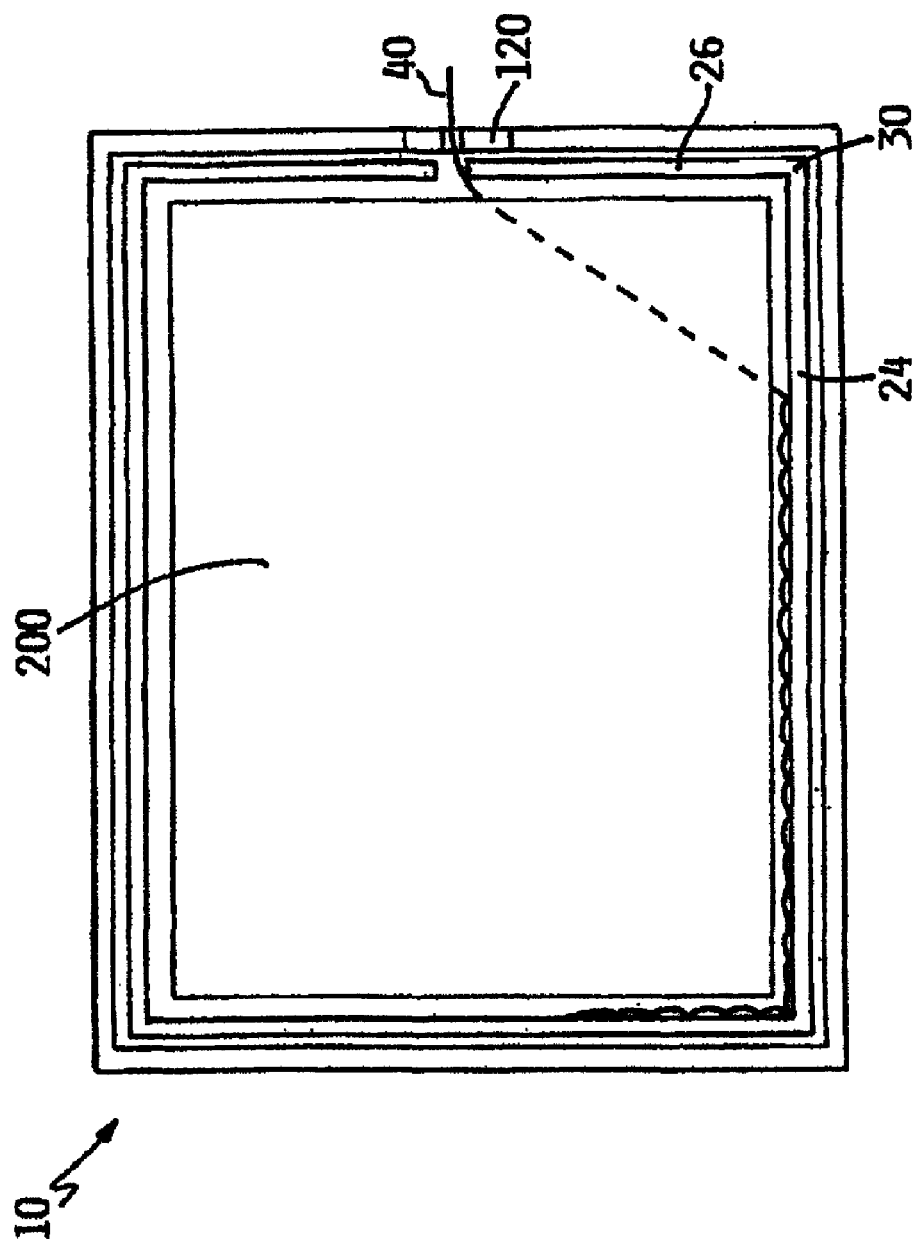
FIG. 6 shows a top plan view of the layer cutting apparatus during the cutting process.

During the cutting operation, cutting line 40 is pulled outward from notch 120. As the force on cutting line 40 overcomes the force attaching cutting line 40 to panel 26, cutting line 40 is pulled away from panel 26 and fourth corner 30 as shown in FIG. 6. The portion of cutting line 40 disposed inside food product 200 begins cutting food product 200 into layers.

Figure 7:
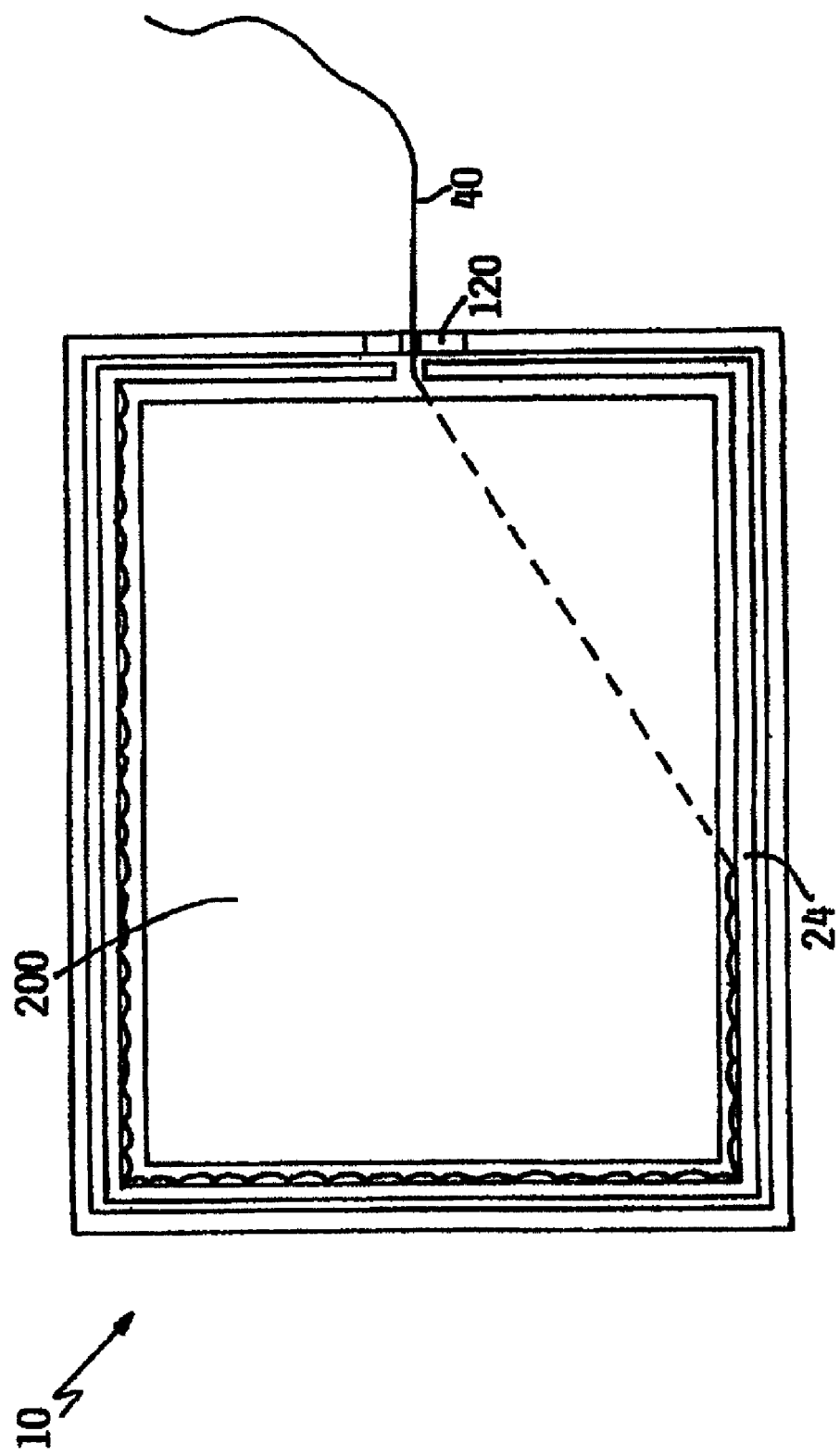
FIG. 7 shows a top plan view of the layer cutting apparatus during the cutting process.
Figure 8:
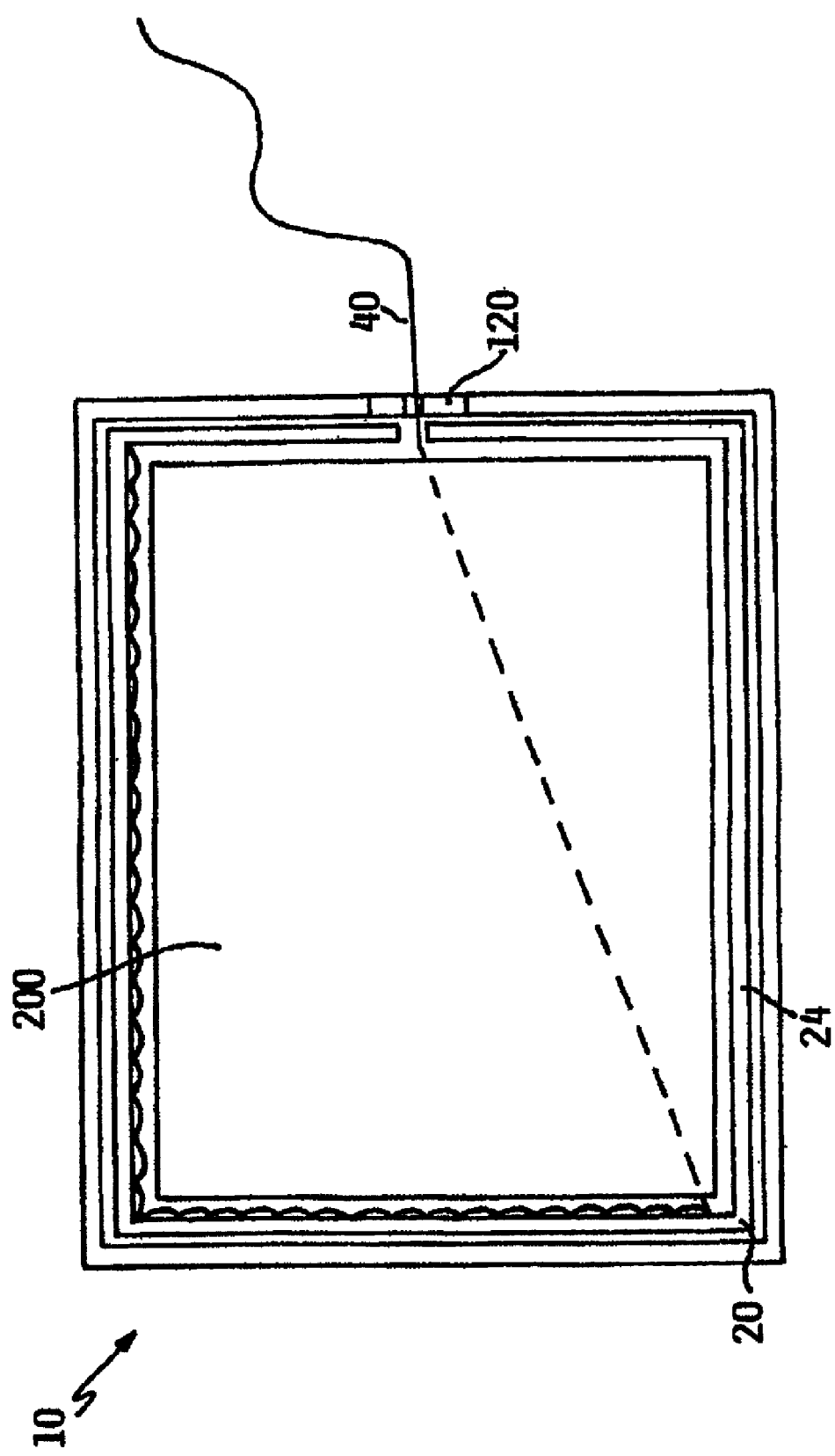
FIG. 8 shows a top plan view of the layer cutting apparatus during the cutting process.
Figure 9:
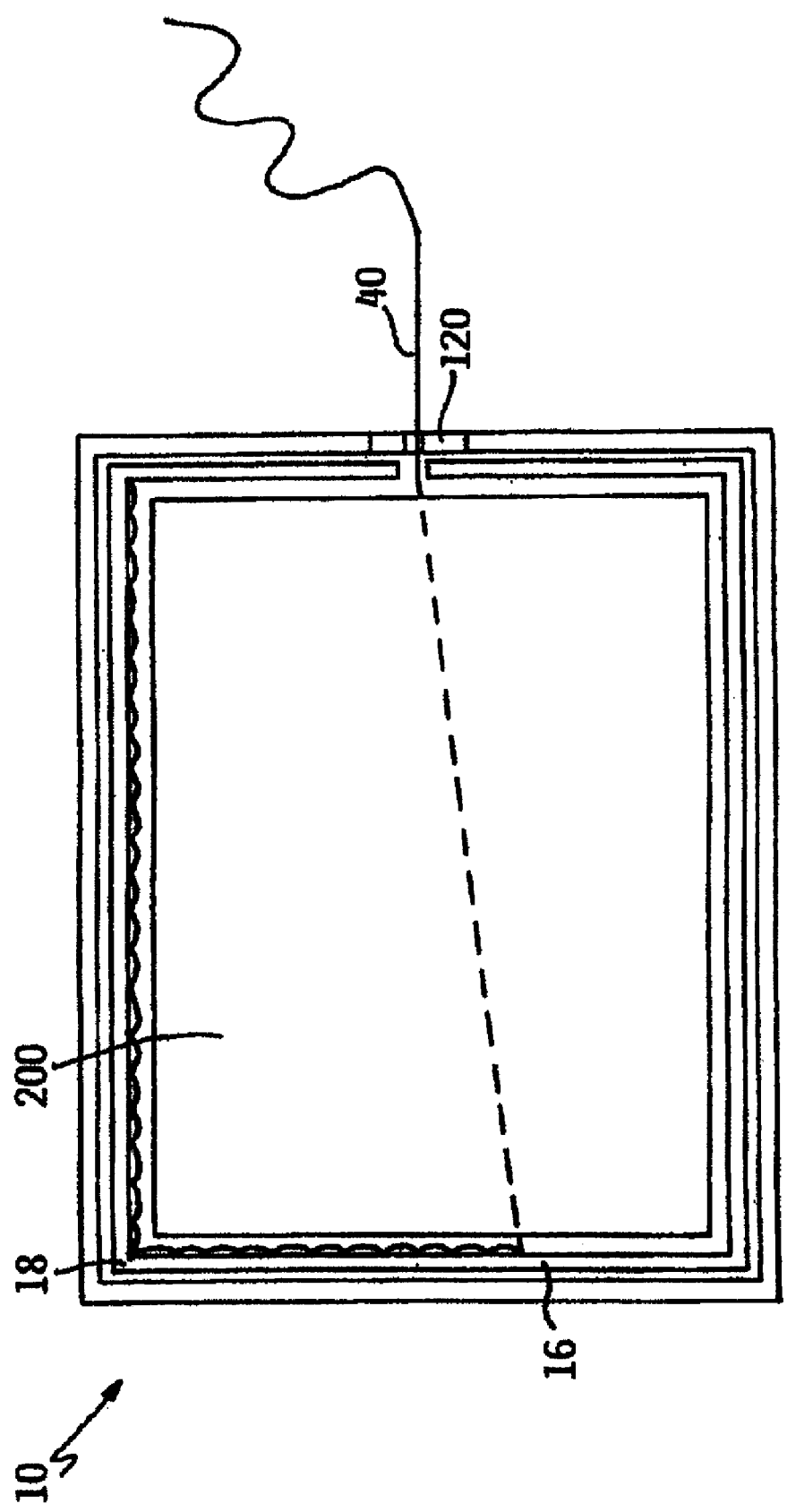
FIG. 9 shows a top plan view of the layer cutting apparatus during the cutting process.
Figure 10:
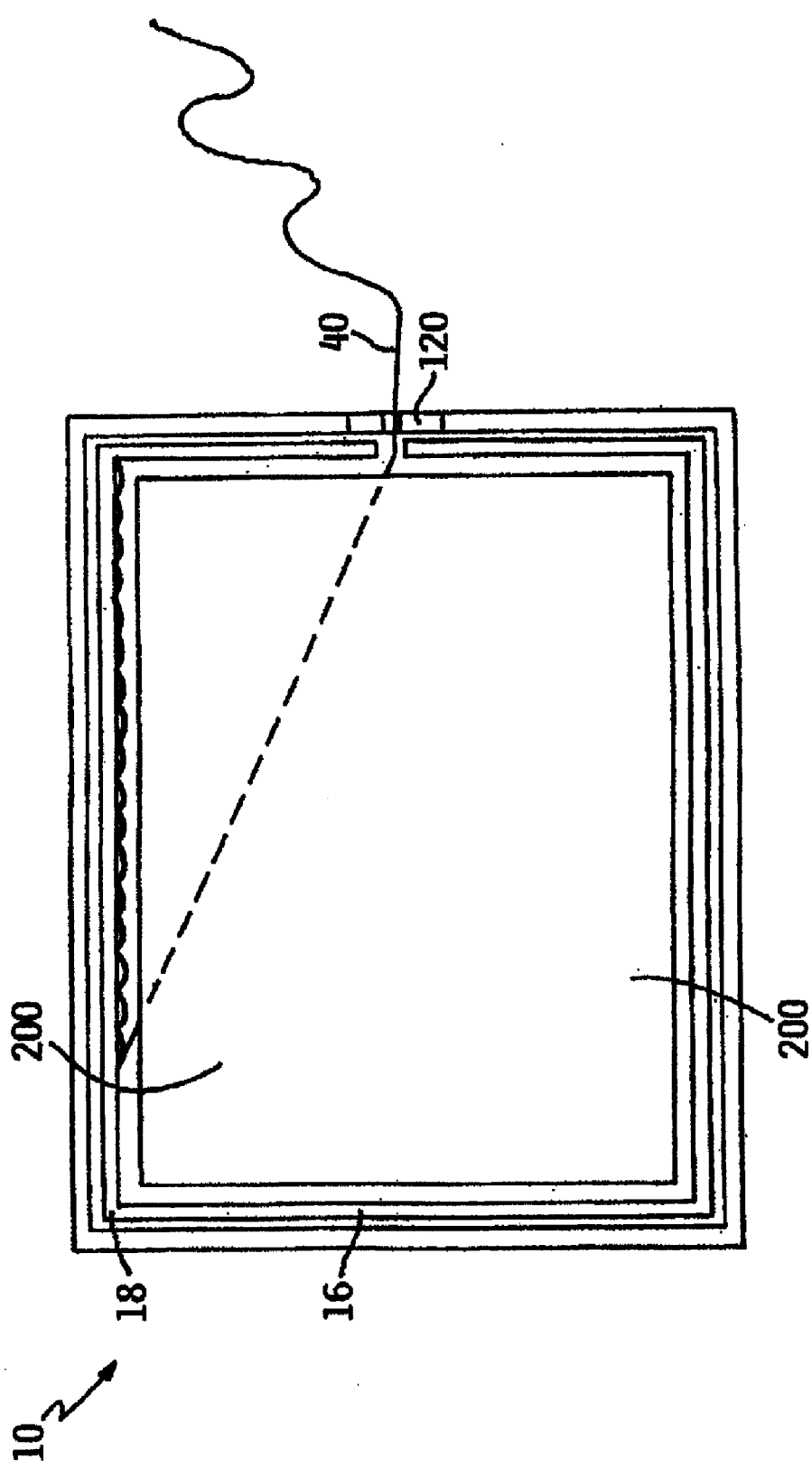
FIG. 10 shows a top plan view of the layer cutting apparatus during the cutting process.

As shown in FIG. 7, cutting line 40 is pulled outward from notch 120 to continue cutting the food product 200 into layers. Cutting line 40 continues to pull away from third side 24 until cutting line 40 is pulled away from second corner 20 as shown in FIG. 8. Next, a user continues pulling cutting line 40 outward from notch 120 so that cutting line 40 is pulled away from first side 16 and first corner 18 as shown in FIGS. 9 and 10. At this point, more than 75% of the food product 200 has been divided into layers.

Figure 11:
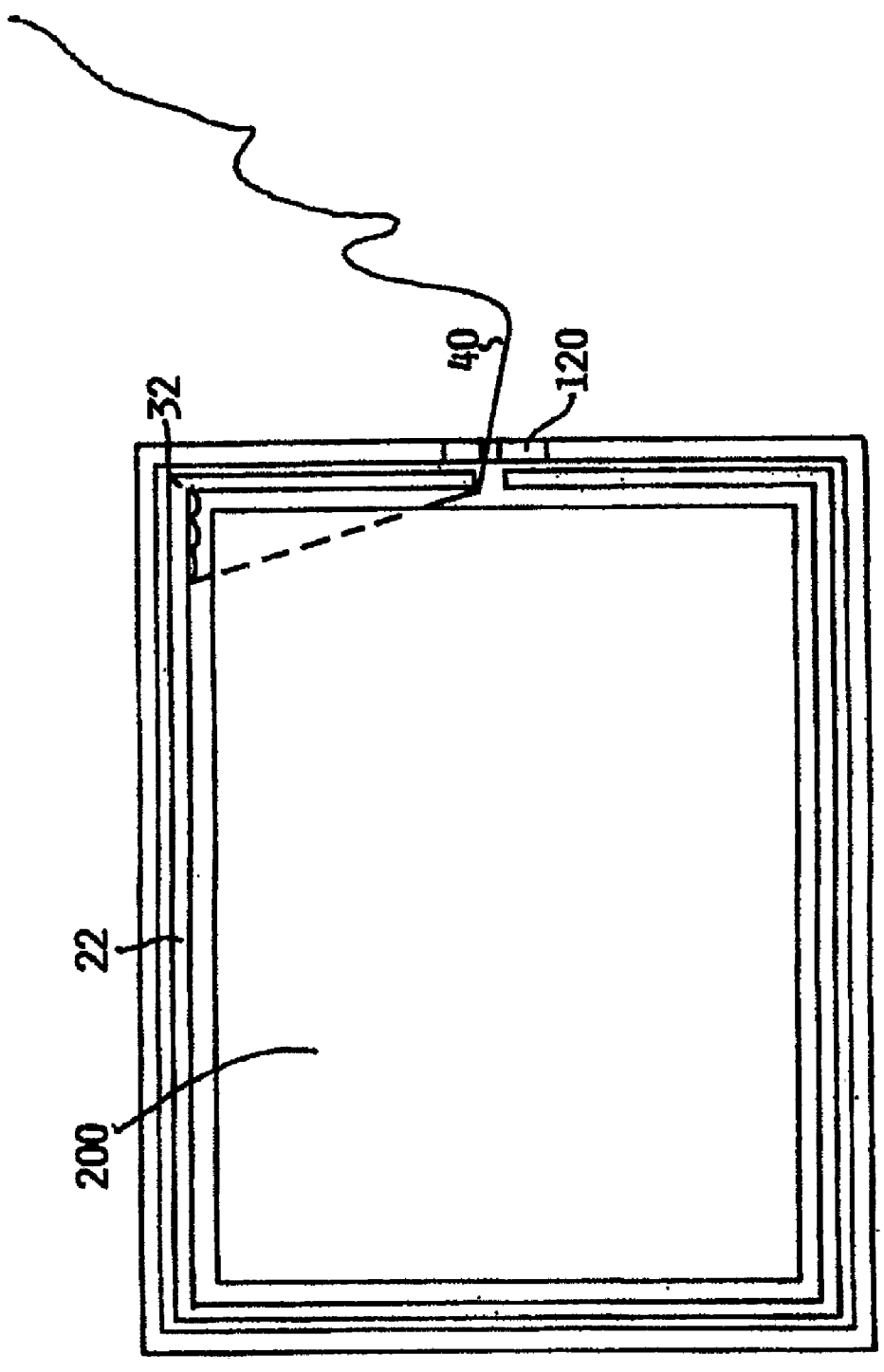
FIG. 11 shows a top plan view of the layer cutting apparatus during the cutting process.

As cutting line 40 continues to be pulled outward from notch 120, cutting line 40 is pulled away from second side 22 as shown in FIG. 11. Once line is pulled past third corner 32, the food product 200 is completely divided into layers.

Figure 21:
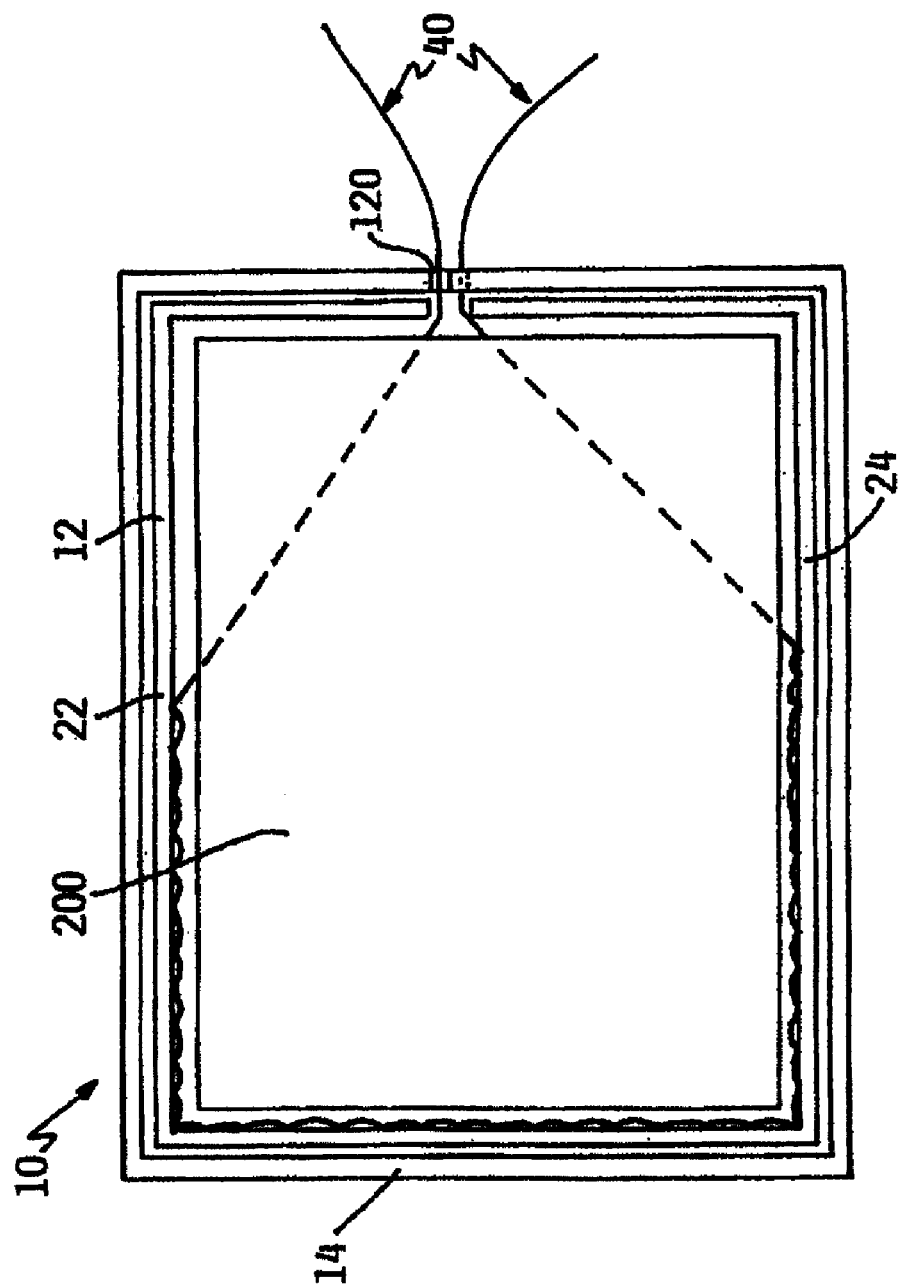
FIG. 21 shows a top view of an alternative embodiment of the layer cutting apparatus during an initial stage of the cutting operation.
Figure 22:
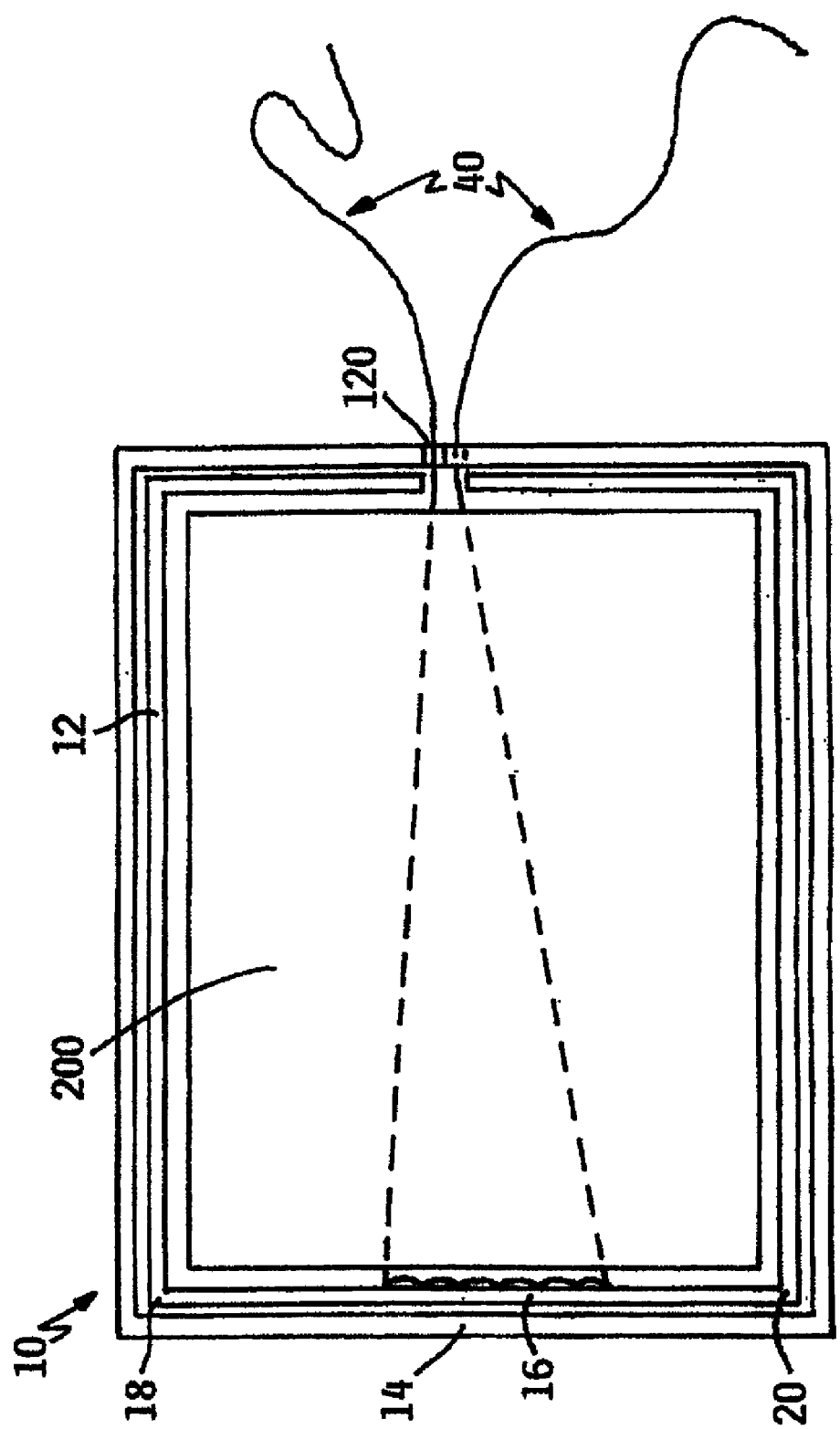
FIG. 22 shows a top view of an alternative embodiment of the layer cutting apparatus during a final stage of the cutting operation.

An alternative embodiment of the cutting process is shown in FIGS. 21 and 22. In this embodiment, cutting line 40 is pulled outward from notch 120 at both ends. This enables cutting line 40 to simultaneously separate from sleeve 12 along second side 22 and third side 24. Once cutting line 40 is pulled away from first corner 18 and second corner 20, cutting line 40 separates from first side 16 as shown in FIG. 22. Once cutting line 40 completely separates from first side 16, cutting line 40 may be pulled entirely through notch 120.

Figure 23:
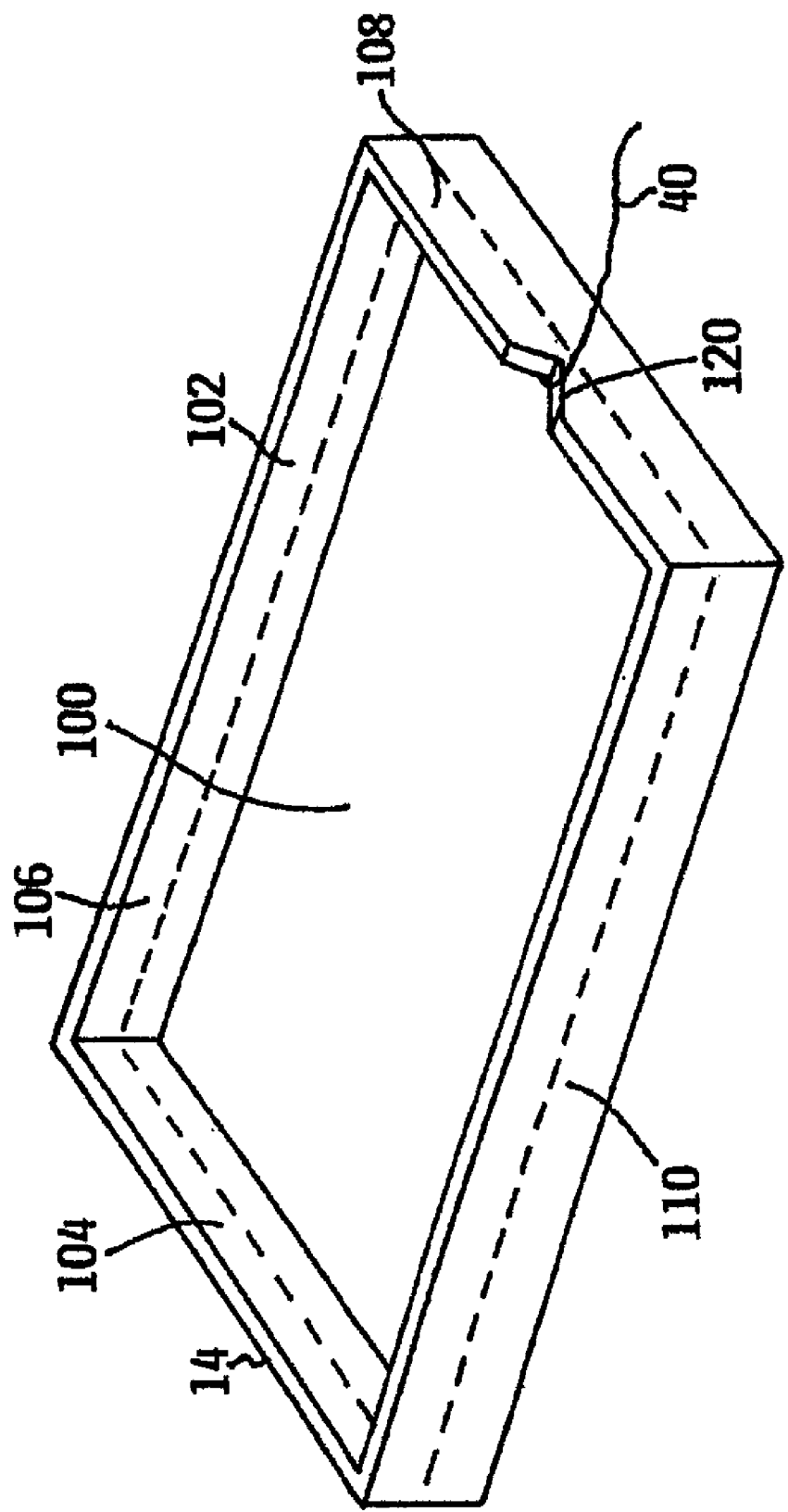
FIG. 23 shows an isometric view of an alternative embodiment of the cutting apparatus incorporating a sleeveless cutting configuration.

In yet an alternative embodiment, cutting line 40 may be attached directly to the sidewall 102 of tray 14 as shown in FIG. 23. Sidewall 102 includes first wall 104, second wall 106, third wall 110, and fourth wall 108. As cutting line 40 is pulled away from notch 120, cutting line 40 separates from sidewall as previously discussed.

Figure 12:
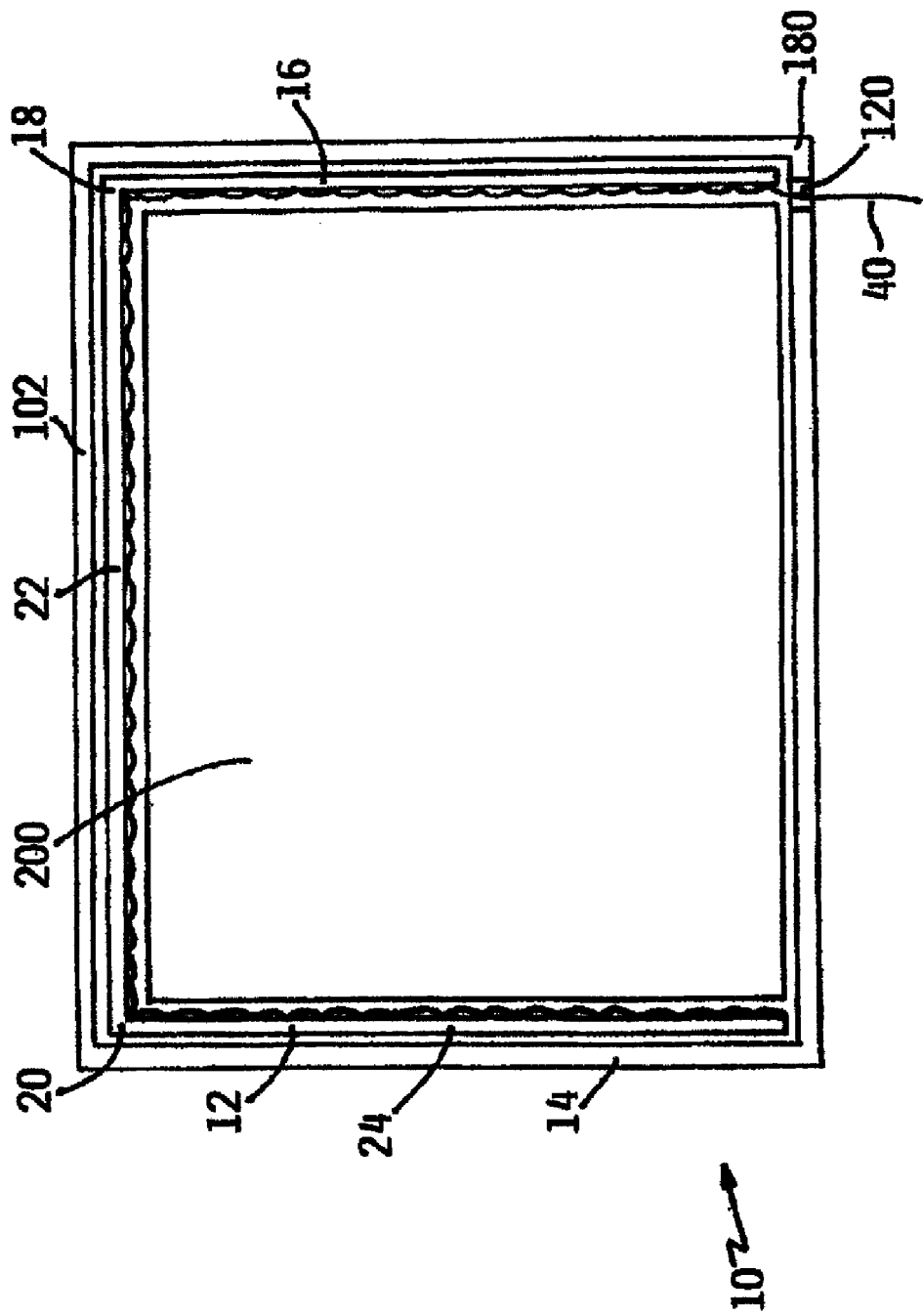
FIG. 12 shows a top plan view of an alternative embodiment of the layer cutting apparatus during the cutting process.

FIG. 12 illustrates an alternative embodiment of the apparatus 10. In this embodiment, sleeve 12 contains three sides including a first side 16, a second side 22, and a third side 24. Sides 16, 22, and 24 are located around three sides of food product 200, between food product 200 and the sidewall 102. Notch 120 is located adjacent to corner 180 of tray 14. Cutting line 40 extends through notch 120.

Figure 13:
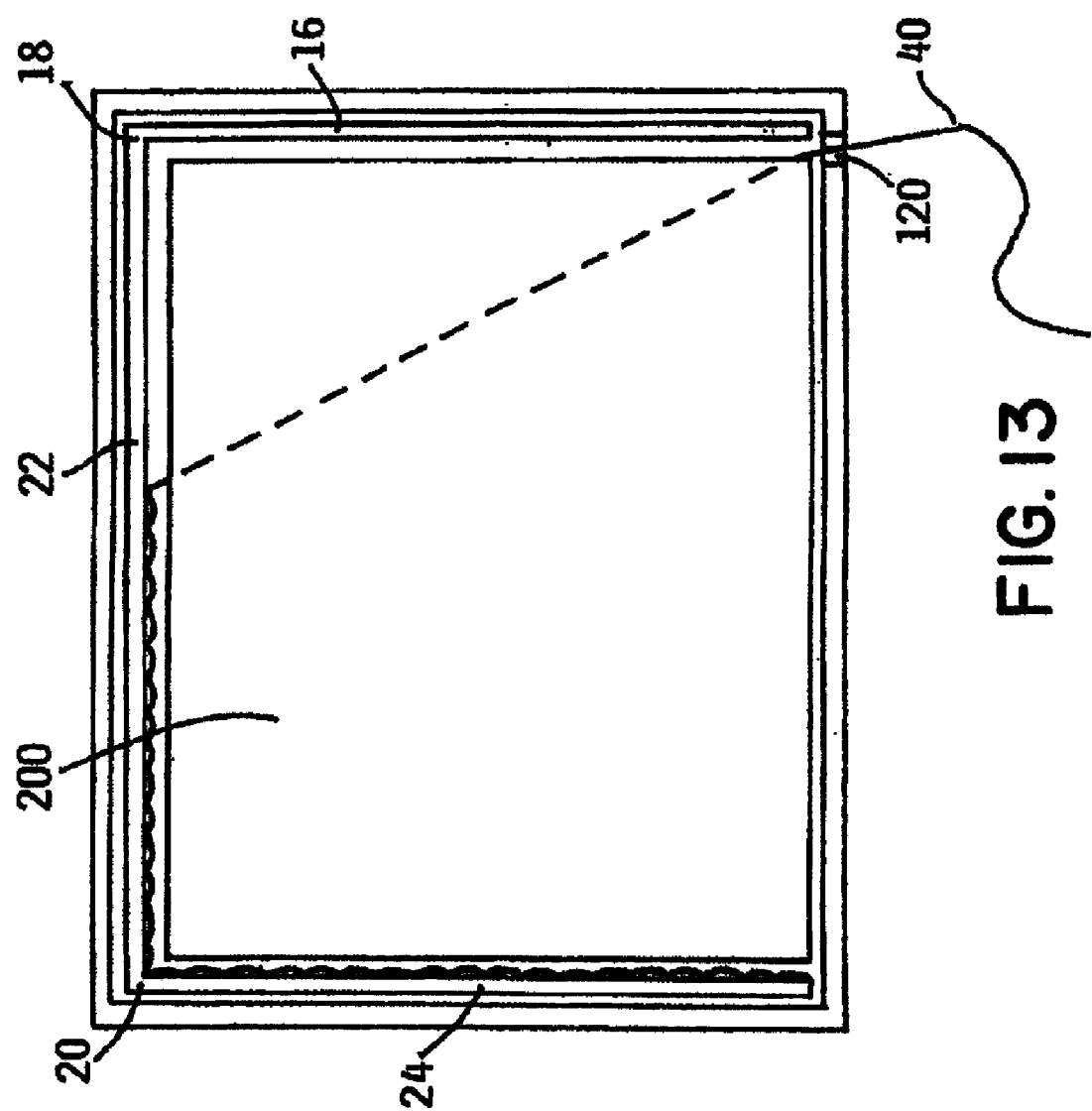
FIG. 13 shows a top plan view of an alternative embodiment of the layer cutting apparatus during the cutting process.
Figure 14:
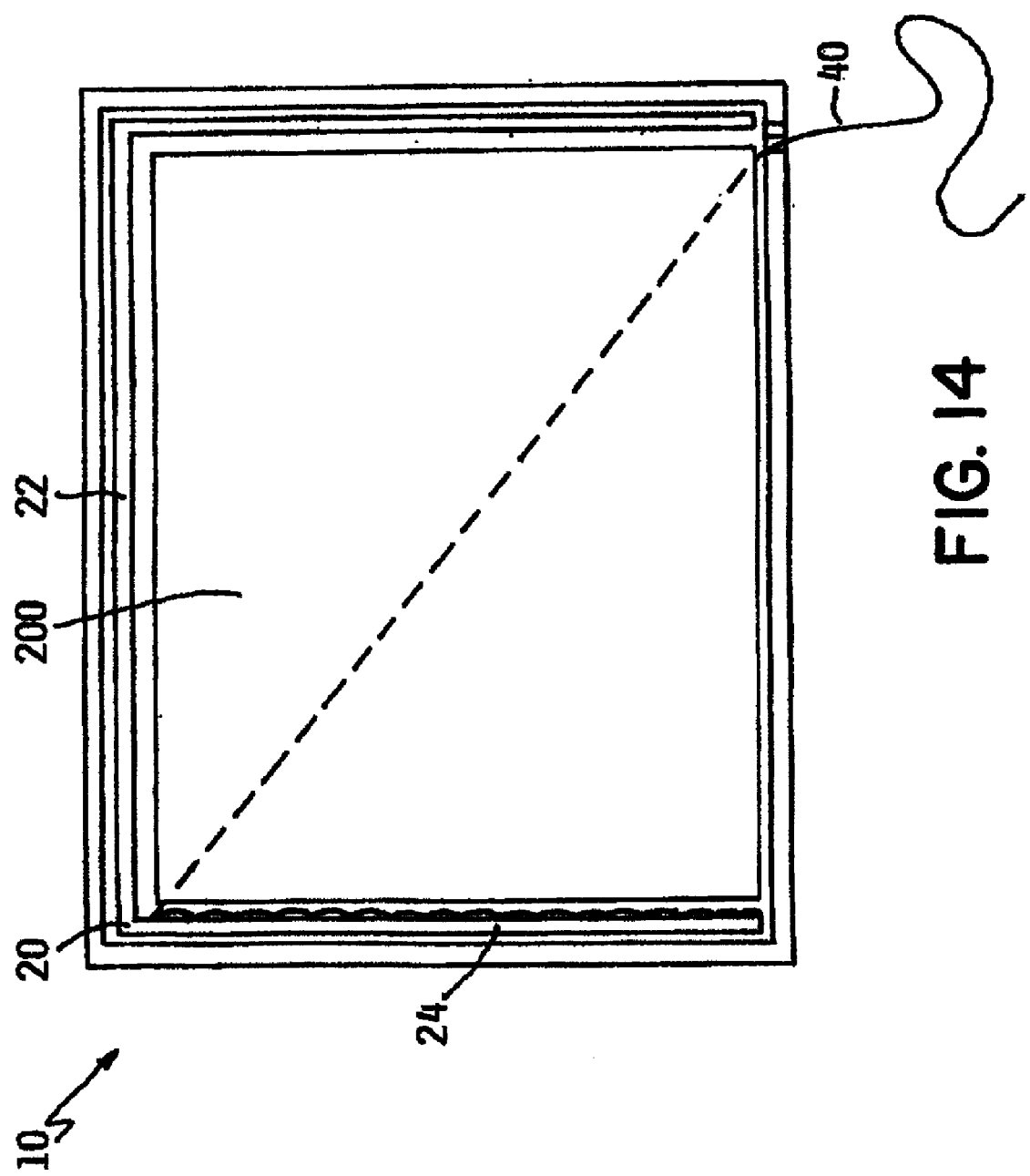
FIG. 14 shows a top plan view of an alternative embodiment of the layer cutting apparatus during the cutting process.
Figure 15:
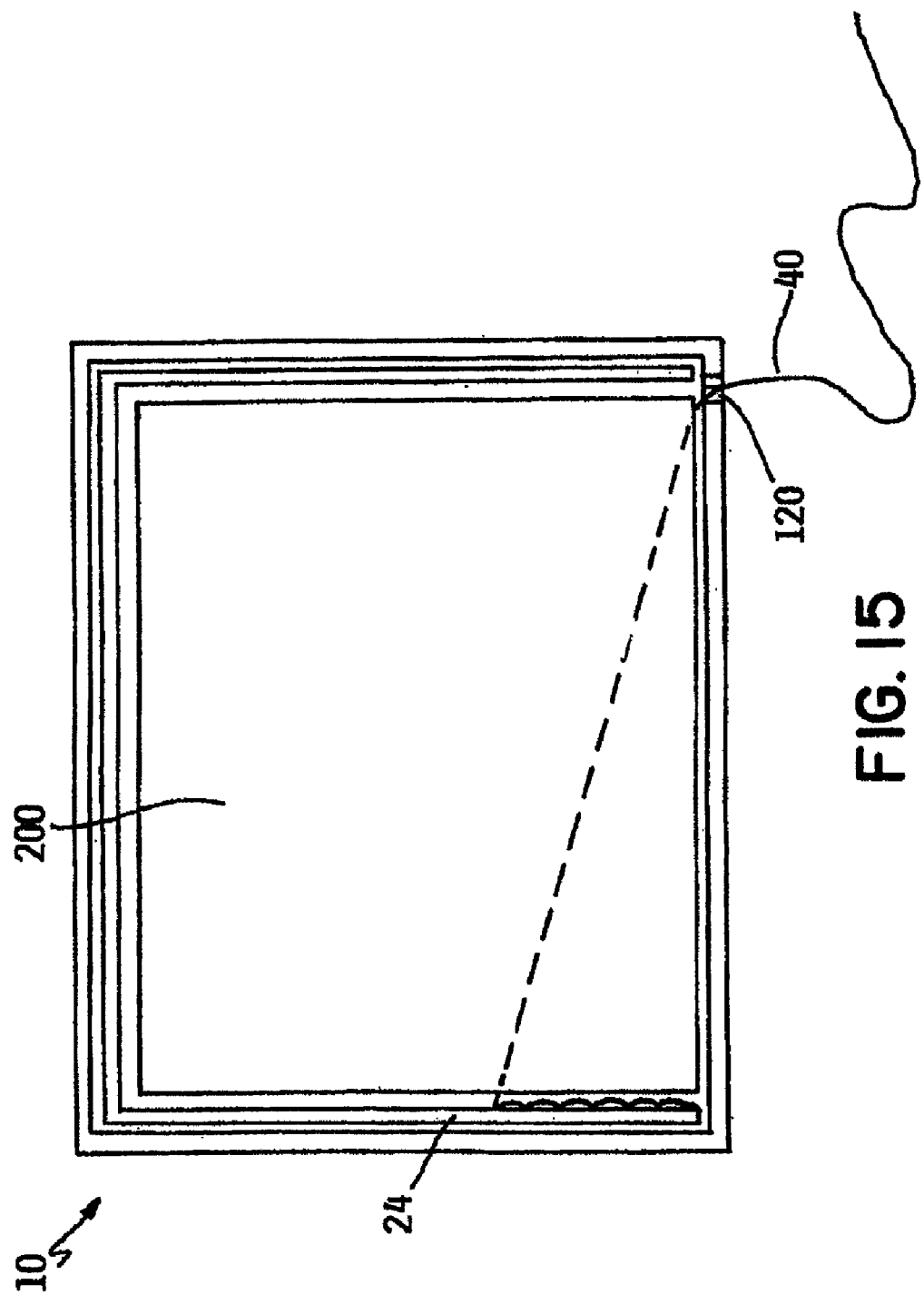
FIG. 15 shows a top plan view of an alternative embodiment of the layer cutting apparatus during the cutting process.
Figure 16:
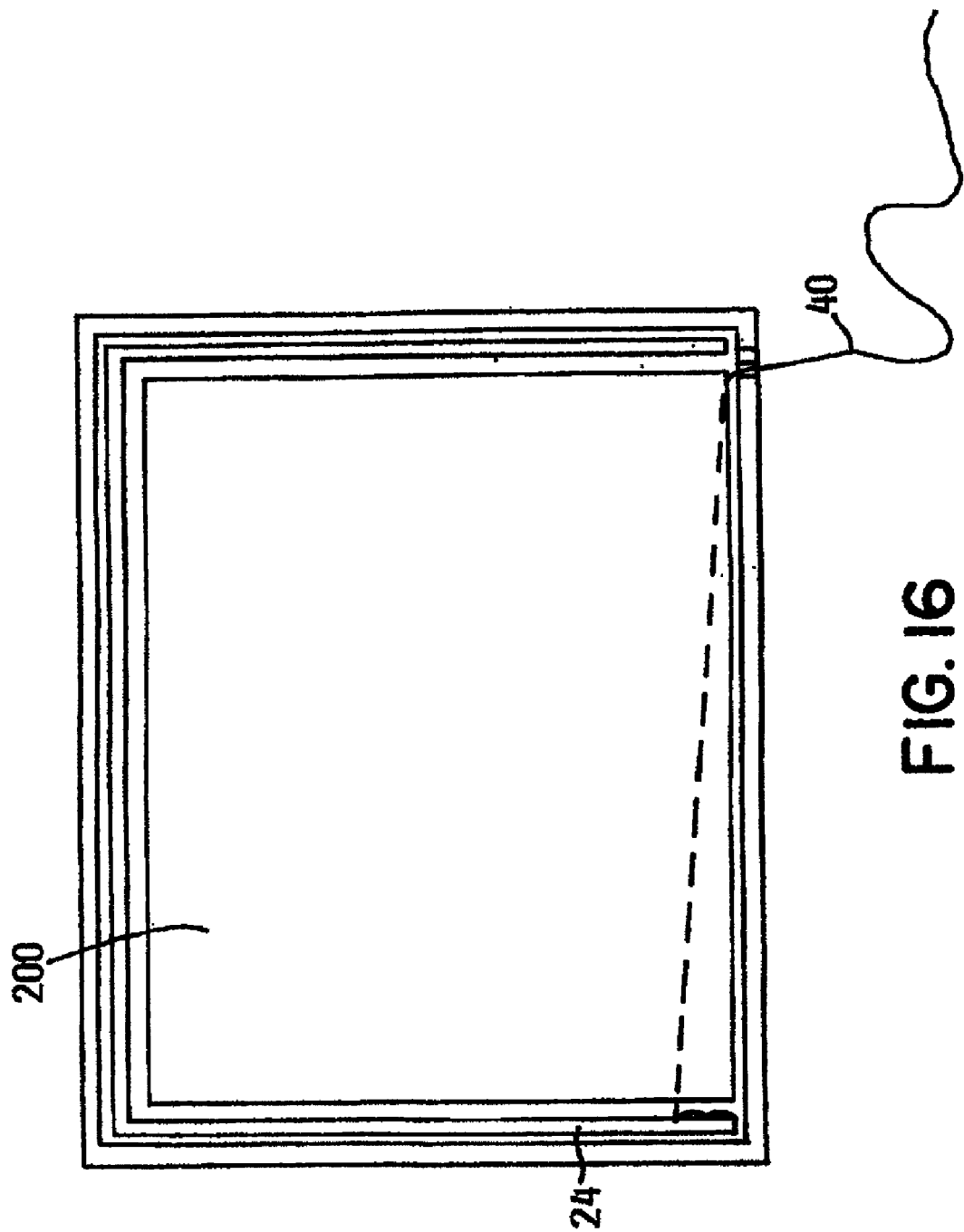
FIG. 16 shows a top plan view of an alternative embodiment of the layer cutting apparatus during the cutting process.

As shown in FIG. 13, cutting line 40 is pulled outward from notch 120. Once cutting line 40 is pulled away from first corner 18 toward second corner 20, the cutting process begins. As cutting line 40 is pulled away from second corner 20 as shown in FIG. 14, approximately half the food product 200 is divided into layers as shown in FIG. 14. As cutting line 40 is pulled further away from notch 120, cutting line 40 becomes increasingly separated from third side 24 as shown in FIGS. 15 and 16. Once cutting line 40 becomes unattached from third side 24, the food product 200 is completely separated into layers.

Figure 17:
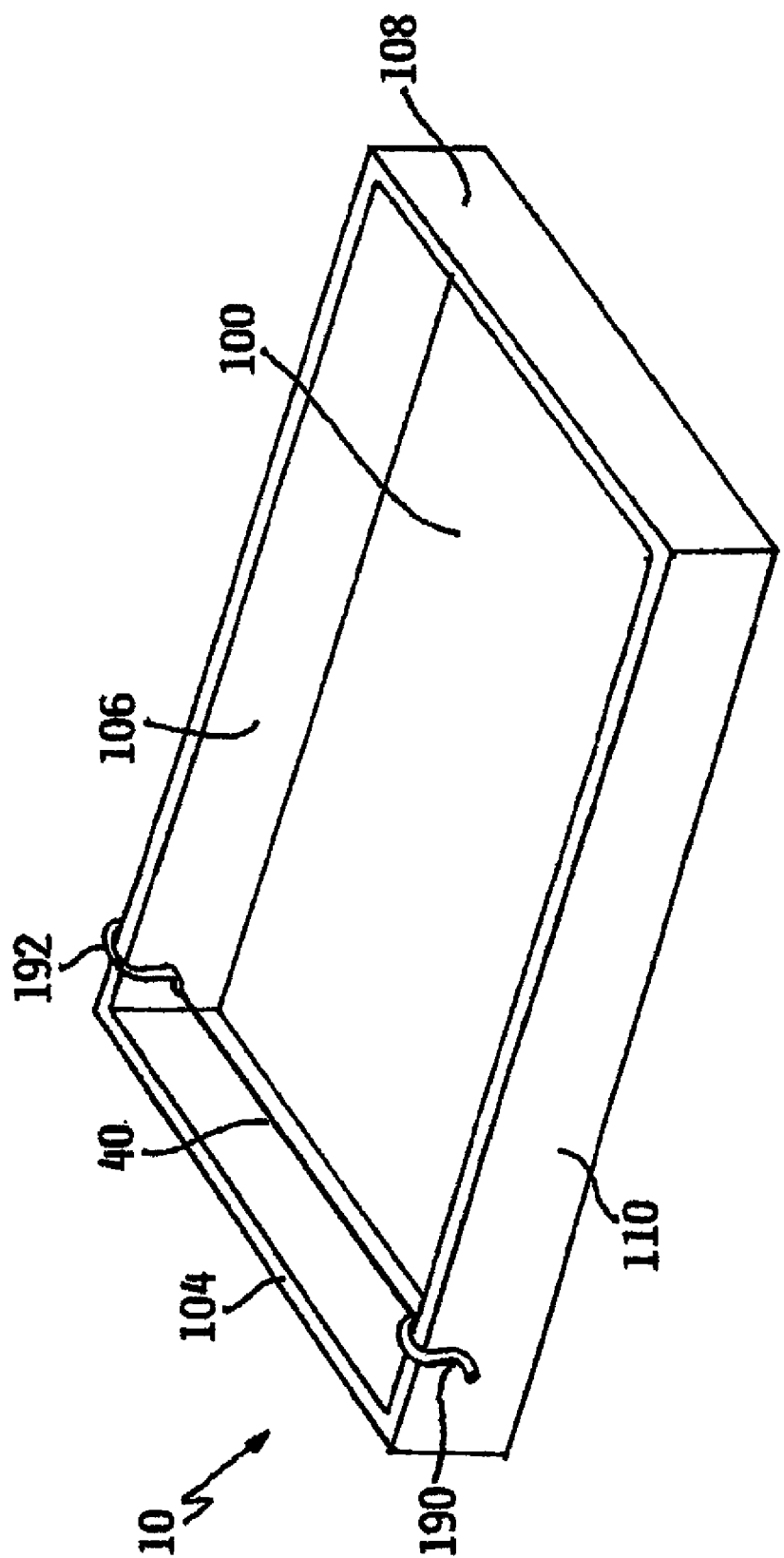
FIG. 17 shows an isometric view of an alternative embodiment of the layer cutting apparatus.

FIG. 17 shows a sleeveless layer cutting apparatus 10. Apparatus 10 includes tray 14 with first wall 104, second wall 106, third wall 110, and fourth wall 108. Hook 190 is disposed over third wall 110 at a location adjacent to first wall 104. Similarly, hook 192 is disposed over second wall 106 at a location adjacent to first wall 104. Cutting line 40 attached to hook 190 and hook 192 and suspended over bottom 100. When food product 200 rests on bottom 100, food product can be cut into layers by moving hooks 190 and 192 from a location adjacent to first wall 104 to a location adjacent to fourth wall 108.

Figure 18:
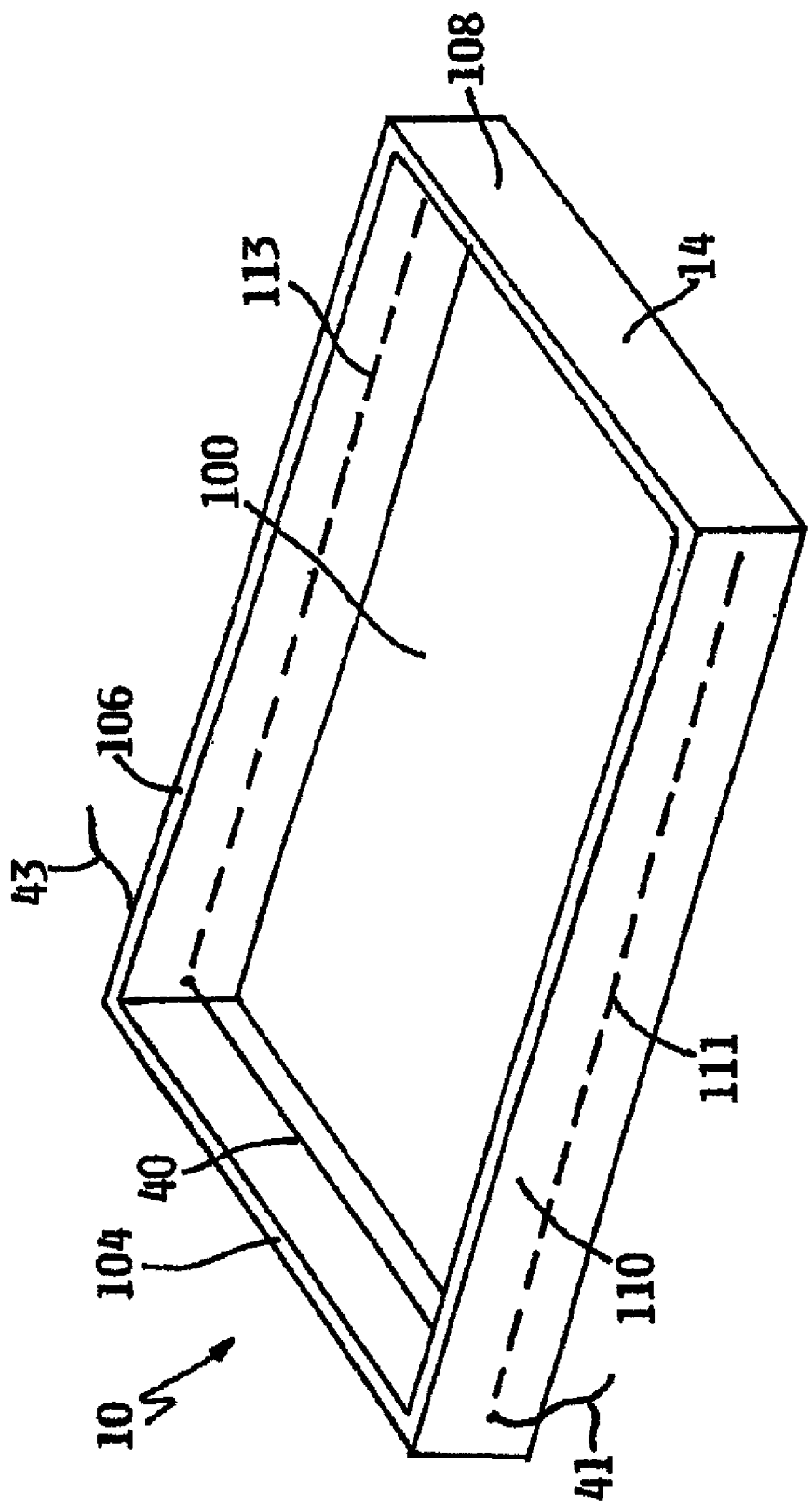
FIG. 18 shows an isometric view of another alternative embodiment of the layer cutting apparatus.

Another alternative embodiment of a sleeveless layer cutting apparatus 10 is shown in FIG. 18. Apparatus 10 includes tray 14 with first wall 104, second wall 106, third wall 110, and fourth wall 108. Second wall 106 contains perforation line 113 extending from first wall 104 to fourth wall 108. Third wall 110 contains perforation line 111 extending from first wall 104 to fourth wall 108. Cutting line 40 is suspended between second wall 106 and third wall 110. End 41 of cutting line 40 protrudes through the portion of perforation line 111 that is adjacent to first wall 104. End 43 of cutting line 40 protrudes through the portion of perforation line 113 that is adjacent to first wall 104.

When food product 200 rests on bottom 100, food product can be cut into layers by pulling end 41 and end 43 from a location adjacent to first wall 104 to a location adjacent to fourth wall 108. In one embodiment, perforation lines 111 and 113 are substantially parallel to bottom 100. This configuration helps ensure that the lower layer 204 of food product 200 is uniform. Cutting line 40 may be fabricated from a variety of materials described above. Alternatively, cutting line 40 may be comprised of industrial tear tapes. The tear tapes can be incorporated into tray 14 either within the tray or on the surface of the tray. Existing tear tapes are in the range of about 1 mm to about 0.25 inches.

FIG. 20 shows an alternative embodiment of apparatus 10 configured to cut multiple layers. Multiple lines 40 and 41 are disposed in sleeve 12. Cutting line 40 is generally parallel to line 41 to create generally uniform layers. Alternatively, lines 40 and 41 can comprise wavy or zig-zag patterns as previously discussed. Ends of lines 40 and 41 extend through hole 121. As lines 40 and 41 are pulled outwardly from hole 121, three layers are formed in accordance with the method described above. It is important to note, however, that more than two lines may be disposed in sleeve 12 while remaining within the scope of the invention.

FIG. 24 shows another alternative embodiment of apparatus 10 that is especially useful for dividing the contents of tray 14 into portions. Tray 14 includes sidewall 102 having a first wall 104, second wall 106, third wall 110, and fourth wall 108. Cutting line 80 is disposed in first wall 104, bottom 100, and fourth wall 108. Similarly, line 82 is generally parallel to line 80 and is disposed in first wall 104, bottom 100, and fourth wall 108. End 81 of line 80 may be pulled away from first wall 104 toward and ultimately beyond fourth wall 108. During this process a vertical slice can be made in the contents of tray 14. Subsequently, end 83 of line 82 can be pulled away from first wall 104 toward fourth wall 108. This process causes another vertical slice to be made in the contents of tray 14.

In another embodiment, end 81 of line 80 and end 83 of line 82 can each be fixed to handle 88. As handle 88 is pulled away from first wall 104 toward fourth wall 108, lines 80 and 82 simultaneously pull away from first wall 104, bottom 100, and fourth wall 108 to form separate divisions in the contents of tray 14.

To further partition the food product, additional lines 86, 87, and 89 may be disposed in the tray 14. Line 86 is disposed in second wall 106, bottom 100, and third wall 110. Line 87 is also disposed in second wall 106, bottom 100, and third wall 100. Similarly, line 89 is disposed in second wall 106, bottom 100, and third wall 110. Lines 86, 87, and 89 intersect each of lines 80 and 82. In one embodiment, lines 86, 87, and 89 are parallel to one another. In a preferred embodiment, lines 86, 87, and 89 are each perpendicular to lines 80 and 82.

As discussed above, lines 86, 87, and 89 may be independently pulled from second wall 106 to third wall 110. Alternatively, ends of lines 86, 87, and 89 may be fixed to handle 91. As handle 91 is moved from second wall 106 to third wall 110, lines 86, 87, and 89 simultaneously divide the contents of tray 14.

In one embodiment, handle 88 is attached to first wall 104 using perforation line 93. Similarly, handle 91 is attached to second wall 106 using perforation line 95. When the contents of tray 14 are ready to be partitioned, handle 88 is separated from first wall 104 along perforation line 93. Next, handle 88 is moved toward, and ultimately past fourth wall 108 until lines 80 and 82 are completely separated from the contents of the container. Then, handle 91 can be separated from second wall 106 along perforation 95. Handle 91 is then moved toward and past third wall 110 until lines 86, 87, and 89 are completely separated from the contents of the container.

Although the present invention has been described with reference to preferred embodiments, persons of ordinary skill will recognize that changes can be made in form and detail without departing from the spirit and scope of the present invention.

The invention claimed is:

1. A method of cutting a food product into layers, the method comprising:
   providing a tray containing the food product, the tray having a bottom, a first side, a second side, a front wall, and a back wall, wherein the first side contains a first perforation line extending from the front wall to the back wall, the first perforation line positioned substantially parallel to the bottom, and wherein the second side contains a second perforation line extending from the front wall to the back wall, the second perforation line positioned substantially parallel to the bottom;
   wherein the tray further includes a cutting line having a first end and a second end, the cutting line spanning between the first side and the second side such that the first end of the cutting line protrudes through the first perforation line at an initial position adjacent to the front wall and the second end of the cutting line protrudes through the second perforation line at a position adjacent to the front wall;
   pulling on the first end of the cutting line and the second end of the cutting line to provide tension on the cutting line;
   moving the first end of the cutting line along the first perforation line from a position adjacent to the front wall to a terminal position adjacent to the back wall, to separate the first side of the tray into an upper portion and a lower portion along the first perforation line, wherein the first end of the cutting line protrudes through the first perforation line at a position adjacent to the back wall; and
   moving the second end of the cutting line along the second perforation line from a position adjacent to the front wall to a position adjacent to the back wall, to separate the second side of the tray into an upper portion and a lower portion along the second perforation line, wherein the second end of the cutting line protrudes through the second perforation line at a position adjacent to the back wall, with moving the first and second ends of the cutting line further comprising cutting the food product into upper and lower layers.

2. The method of claim 1, further comprising ensuring the cutting line is substantially parallel to the bottom of the tray.

3. The method of claim 1 wherein providing the tray comprises providing the tray having the front and back walls of solid construction free of perforation lines or openings.

4. The method of claim 1 wherein moving the first and second ends of the cutting lines includes preventing the cutting line from passing through the front and back walls.

5. A method of dividing a food product into layers, the method comprising:
   providing a tray containing the food product, the tray having a bottom, a first side, a second side, a front wall, and a back wall, wherein the first side contains a first perforation line extending from the front wall to the back wall, the first perforation line positioned substantially parallel to the bottom, and wherein the second side contains a second perforation line extending from the front wall to the back wall, the second perforation line positioned substantially parallel to the bottom;
   wherein the tray further includes a cutting line having a first end and a second end, the cutting line spanning between the first side and the second side such that the first end of the cutting line protrudes through the first perforation line at a position adjacent to the front wall and the second end of the cutting line protrudes through the second perforation line at a position adjacent to the front wall;
   pulling on the first end of the cutting line and the second end of the cutting line to provide tension on the cutting line;
   moving the first end of the cutting line along the first perforation line from a position adjacent to the front wall to a position adjacent to the back wall, to separate the first side of the tray into an upper portion and a lower portion along the first perforation line, wherein the first end of the cutting line protrudes through the first perforation line at a position adjacent to the back wall;

moving the second end of the cutting line along the second perforation line from a position adjacent to the front wall to a position adjacent to the back wall, to separate the second side of the tray into an upper portion and a lower portion along the second perforation line, wherein the second end of the cutting line protrudes through the second perforation line at a position adjacent to the back wall, with moving the first and second ends of the cutting line further comprising cutting the food product into upper and lower layers;

ensuring the cutting line is substantially parallel to the bottom of the tray; and baking the food product in the tray prior to moving the first and second ends of the cutting line.

6. The method of claim 5 wherein baking the food product comprises baking the food product in the tray while including the cutting line spanning between the first side and the second side.

\* \* \* \* \*